US012101319B2

(12) United States Patent
Momchilov et al.

(10) Patent No.: US 12,101,319 B2
(45) Date of Patent: Sep. 24, 2024

(54) COMPUTING SESSION MULTI-FACTOR AUTHENTICATION

(71) Applicant: CITRIX SYSTEMS, INC., Fort Lauderdale, FL (US)

(72) Inventors: Georgy Momchilov, Parkland, FL (US); Hubert Divoux, Parkland, FL (US); Santosh Gummunur Chiranjeevi Sampath, Bangalore (IN); Leo C. Singleton, IV, Fort Lauderdale, FL (US)

( * ) Notice: Subject to any disclaimer, the term of this patent is extended or adjusted under 35 U.S.C. 154(b) by 112 days.

(21) Appl. No.: 17/448,536

(22) Filed: Sep. 23, 2021

(65) Prior Publication Data

US 2023/0020656 A1 Jan. 19, 2023

Related U.S. Application Data

(60) Provisional application No. 63/203,025, filed on Jul. 6, 2021.

(51) Int. Cl.
*H04L 29/06* (2006.01)
*H04L 9/40* (2022.01)

(52) U.S. Cl.
CPC ...... *H04L 63/0884* (2013.01); *H04L 63/0838* (2013.01); *H04L 63/0846* (2013.01); *H04L 63/0861* (2013.01); *H04L 2463/082* (2013.01)

(58) Field of Classification Search
CPC ............. H04L 63/0884; H04L 63/0838; H04L 63/0846; H04L 63/0861; H04L 2463/082; H04L 63/06; H04L 63/123; H04L 63/0807; H04L 63/083; H04L 63/10; H04L 63/0853; G06F 21/53

See application file for complete search history.

(56) References Cited

U.S. PATENT DOCUMENTS

| | | | |
|---|---|---|---|
| 8,132,247 B2 | 3/2012 | Adhya et al. | |
| 8,213,393 B2 | 7/2012 | Suganthi et al. | |
| 8,301,686 B1 | 10/2012 | Appajodu et al. | |
| 8,443,358 B1 | 5/2013 | Larkin et al. | |
| 9,009,327 B2 | 4/2015 | Adhya et al. | |
| 9,281,945 B2 * | 3/2016 | Voice | H04L 63/083 |
| 9,286,281 B2 | 3/2016 | Dunn et al. | |
| 9,800,669 B2 | 10/2017 | Bell | |
| 10,148,629 B1 * | 12/2018 | Roth | H04L 63/0838 |
| 10,735,198 B1 * | 8/2020 | Tang | H04L 9/3215 |
| 10,778,591 B2 | 9/2020 | Ramaiah et al. | |
| 2004/0187018 A1 * | 9/2004 | Owen | H04L 9/321 |
| | | | 713/184 |
| 2013/0219468 A1 * | 8/2013 | Bell | H04L 67/14 |
| | | | 726/4 |

(Continued)

*Primary Examiner* — Khalid M Almaghayreh

(57) ABSTRACT

A computing device includes a memory and a processor configured to cooperate with the memory to receive a connection lease and a token from a client device, with the token being generated responsive to the client device completing multi-factor authentication (MFA) with a provider of MFA. The processor further verifies, responsive to unavailability of the provider of MFA, that the client device has previously performed MFA based upon the token, and connect the client device to a computing session with use of the connection lease and responsive to the verification that the client device has performed MFA.

16 Claims, 20 Drawing Sheets

(56) References Cited

U.S. PATENT DOCUMENTS

| | | |
|---|---|---|
| 2015/0295717 A1* | 10/2015 | Brittan .................. H04L 9/3226 713/168 |
| 2016/0241536 A1* | 8/2016 | Parman ................... G06F 21/31 |
| 2017/0195334 A1* | 7/2017 | Katieb ................ H04L 63/0861 |
| 2019/0174304 A1* | 6/2019 | Tunnell ............... H04L 63/0838 |
| 2019/0386981 A1* | 12/2019 | Ramesh Kumar .... H04L 9/3228 |
| 2020/0120039 A1* | 4/2020 | Tabares ................. H04L 47/783 |
| 2020/0137056 A1* | 4/2020 | Havaralu Rama Chandra Adiga .................. H04L 63/0892 |
| 2021/0105267 A1* | 4/2021 | Brown ................ G06F 21/6218 |
| 2021/0136113 A1* | 5/2021 | Barhudarian ....... G06F 21/6272 |
| 2022/0247738 A1* | 8/2022 | Gahir ..................... G06F 21/34 |

* cited by examiner

COMPUTING SESSION MULTI-FACTOR AUTHENTICATION

RELATED APPLICATIONS

This application claims the benefit of provisional application Ser. No. 63/203,025 filed Jul. 6, 2021, which is hereby incorporated herein in its entirety by reference.

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A computing device may include a memory and a processor configured to cooperate with the memory to receive a connection lease and a token from a client device, with the token being generated responsive to the client device completing multi-factor authentication (MFA) with a provider of MFA. The processor may further verify, responsive to unavailability of the provider of MFA, that the client device has previously performed MFA based upon the token, and connect the client device to a computing session with use of the connection lease and responsive to the verification that the client device has performed MFA.

In an example embodiment, the connection lease may include data about the MFA, and the processor may be further configured to verify that the token is current based upon the data, and connect the client device to the computing session also responsive to verification of the token being current. In another example embodiment, the processor may verify that the client device has performed MFA for external connections outside of a network.

In an example implementation, the token may have an expiration, and the processor may request MFA authentication from the MFA provider prior to the expiration of the token. Additionally, the processor may be further configured to delay the MFA authentication request responsive to the identity provider being offline and extend the connection to the computing session during the delay, for example. Also, the processor may be further configured to change a level of access associated with the computing session responsive to the identity provider being offline, for example.

In one example embodiment, the MFA may comprise generating a Time-based One-time Password (OTP) based upon a key, and the processor may be further configured to receive the key and verify that the client device has performed MFA based upon the key. In accordance with an example implementation, the processor may verify that the client device has previously performed MFA further based upon secondary information. By way of example, the secondary information may comprise an IP address for a prior successful MFA or a latency associated with communications with the client device.

A related method may include, at a computing device, receiving a connection lease and a token from a client device, with the token being generated responsive to the client device completing multi-factor authentication (MFA) with a provider of MFA. The method may further include verifying, responsive to unavailability of the provider of MFA, that the client device has previously performed MFA based upon the token, and connecting the client device to a computing session with use of the connection lease and responsive to the verification that the client device has performed MFA.

A related non-transitory computer-readable medium may have computer-executable instructions for causing a computing device to perform steps including receiving a connection lease and a token from a client device, with the token being generated responsive to the client device completing multi-factor authentication (MFA) with a provider of MFA. The steps may further include verifying, responsive to unavailability of the provider of MFA, that the client device has previously performed MFA based upon the token, and connecting the client device to a computing session with use of the connection lease and responsive to the verification that the client device has performed MFA.

DETAILED DESCRIPTION

One approach for providing resiliency to users connecting to remote computing sessions are Connection Leases (CLs), which provide long-lived mostly static entitlements to published resources. Another approach is Progressive Web App (PWA) Service Worker caching, which allows for web-based user interface (UI) to be functional even in offline or degraded network conditions. Some entities require Multi-factor Authentication (MFA) to be performed regularly (e.g., hourly) by its users. However, CLs are typically valid for a longer period (e.g., a week) by default. CLs are user-device bound long-lived tokens. In particular, CLs may be signed, encrypted to the user endpoint device, and include an endpoint public key thumbprint for anti-theft protection.

Notwithstanding the security of CLs, certain entities may still require MFA within a CL architecture. Yet, this may result in problems when attempting to strictly apply MFA within a shorter period of time during offline and cloud outage conditions. That is, while CLs are designed to be used during such offline conditions, MFA cloud services are usable when an Internet connection is available and other identity provider cloud services are also available and healthy. The systems and methods described herein overcome these technical challenges by using a token to verify, during an offline condition, that a client device has previously completed MFA. That is, the token is generated responsive to the client device completing MFA with a provider of MFA (e.g., MFA cloud services), and the token may be cached at a computing device for use during an offline condition so that the computing device may still connect the client device to a requested computing session using the token and in compliance with MFA policy.

Figure 1:
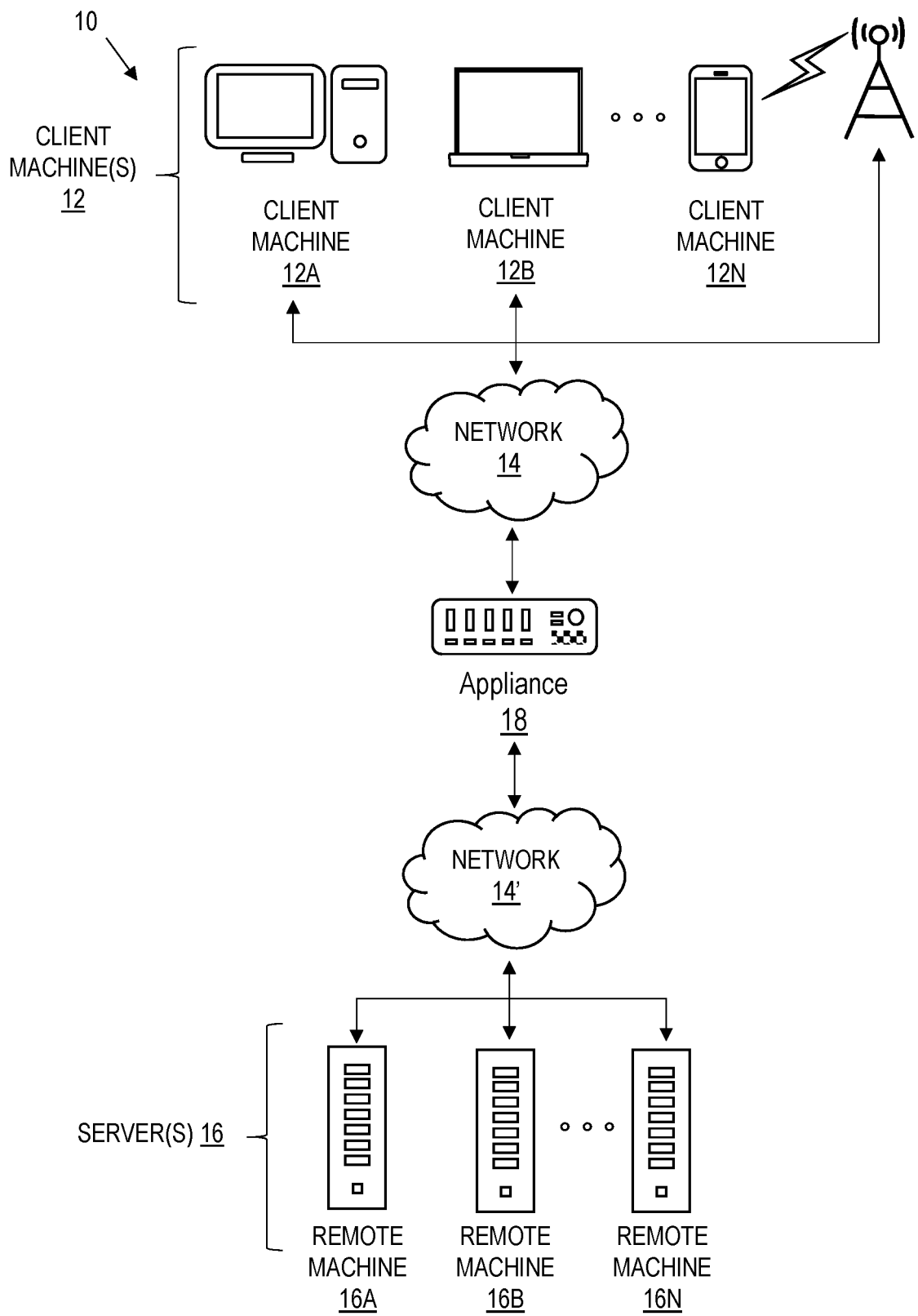
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
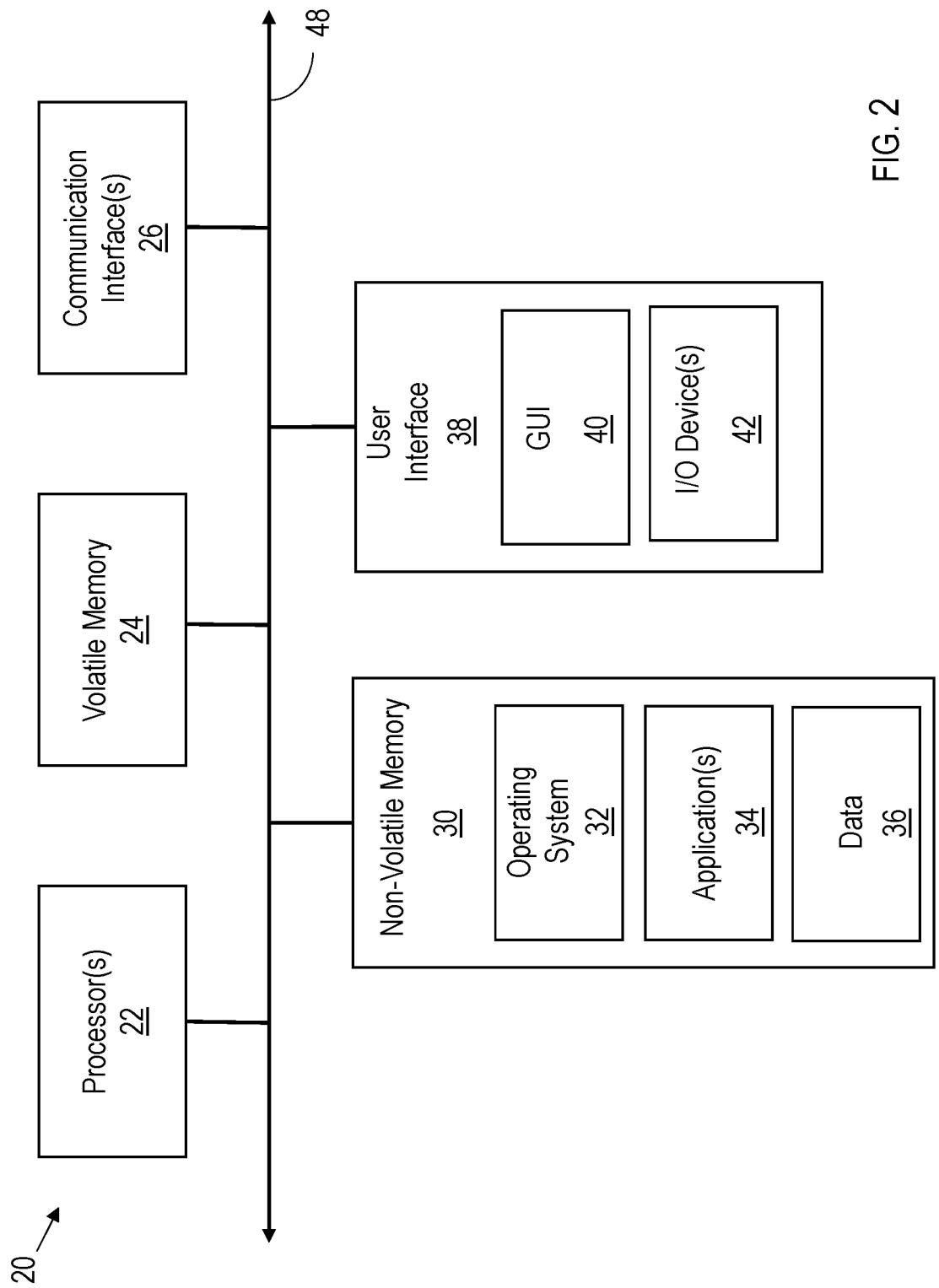
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
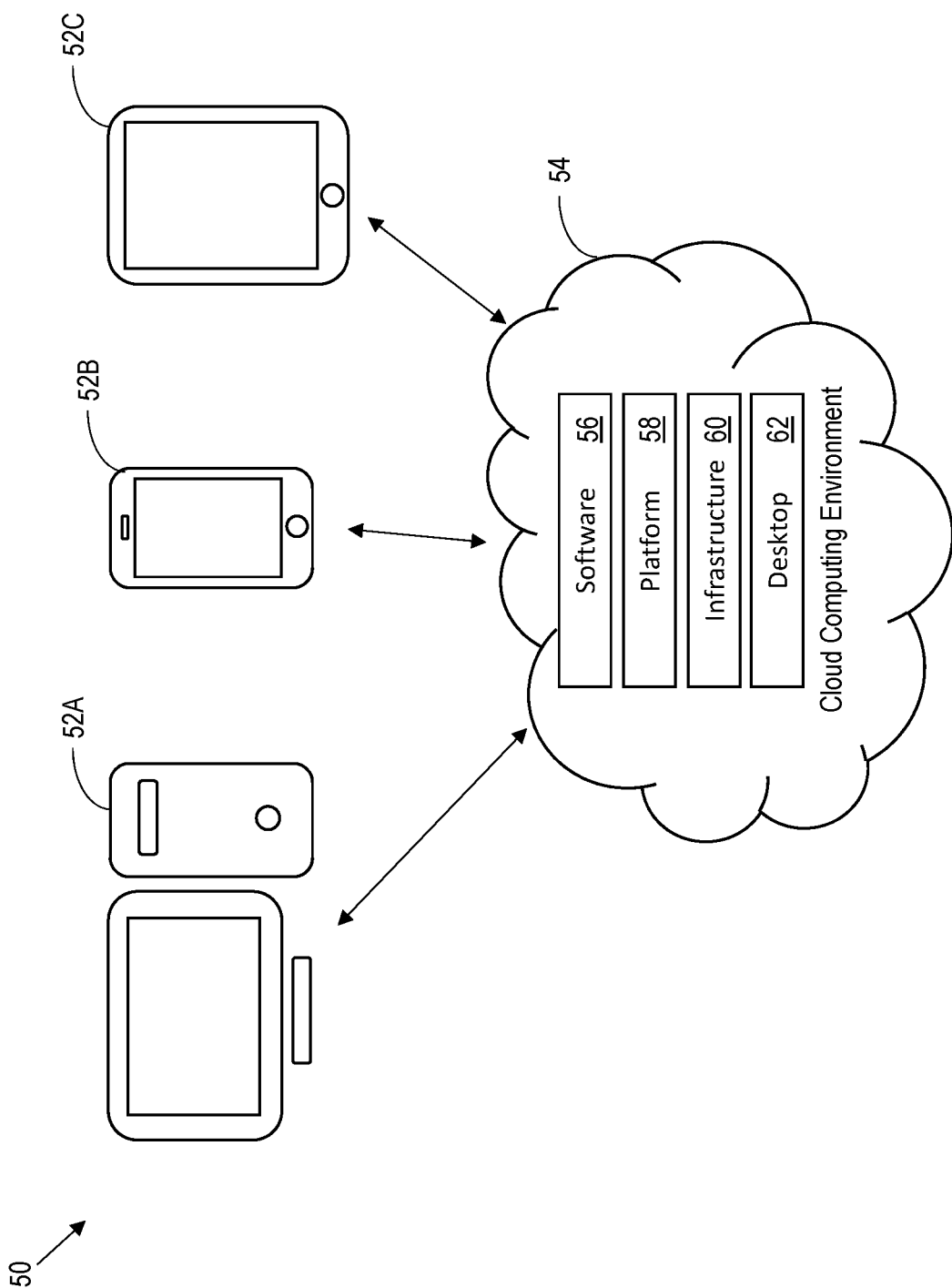
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
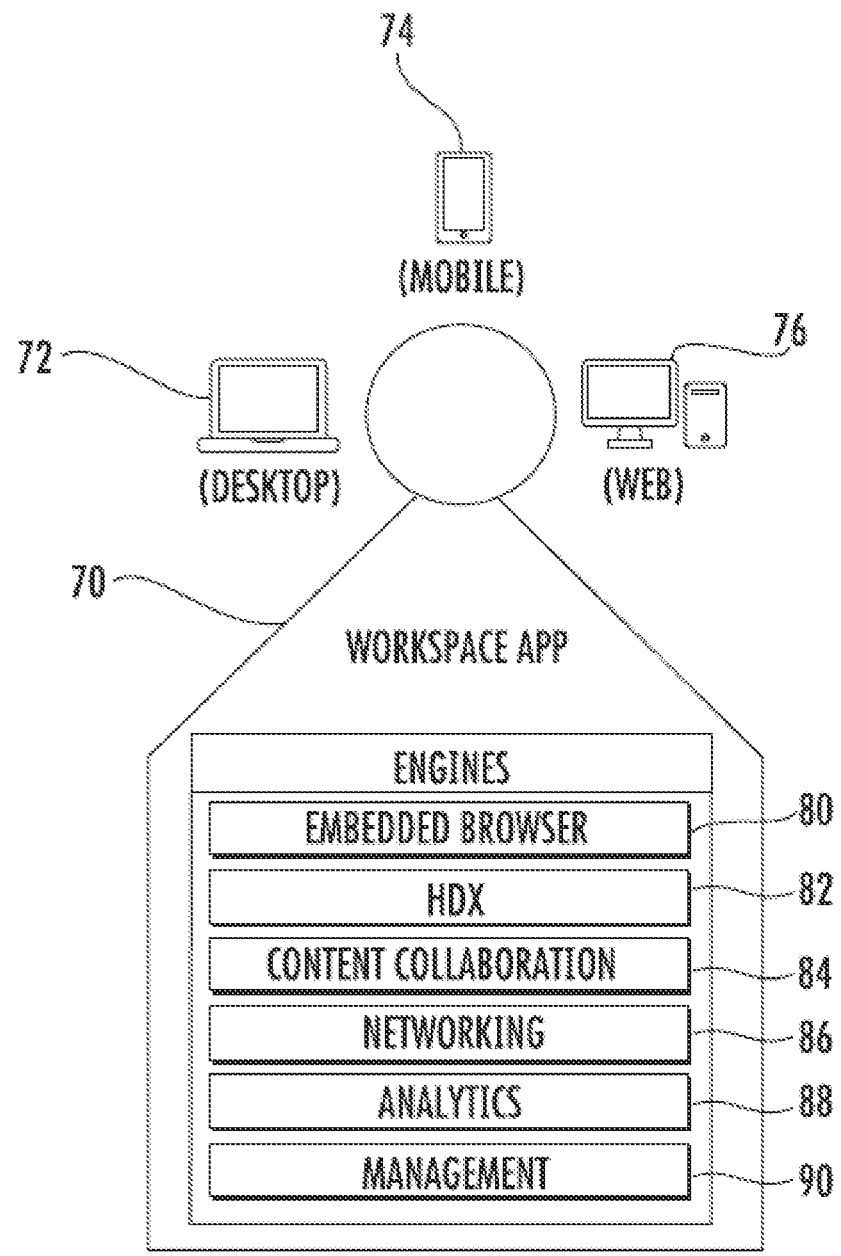
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
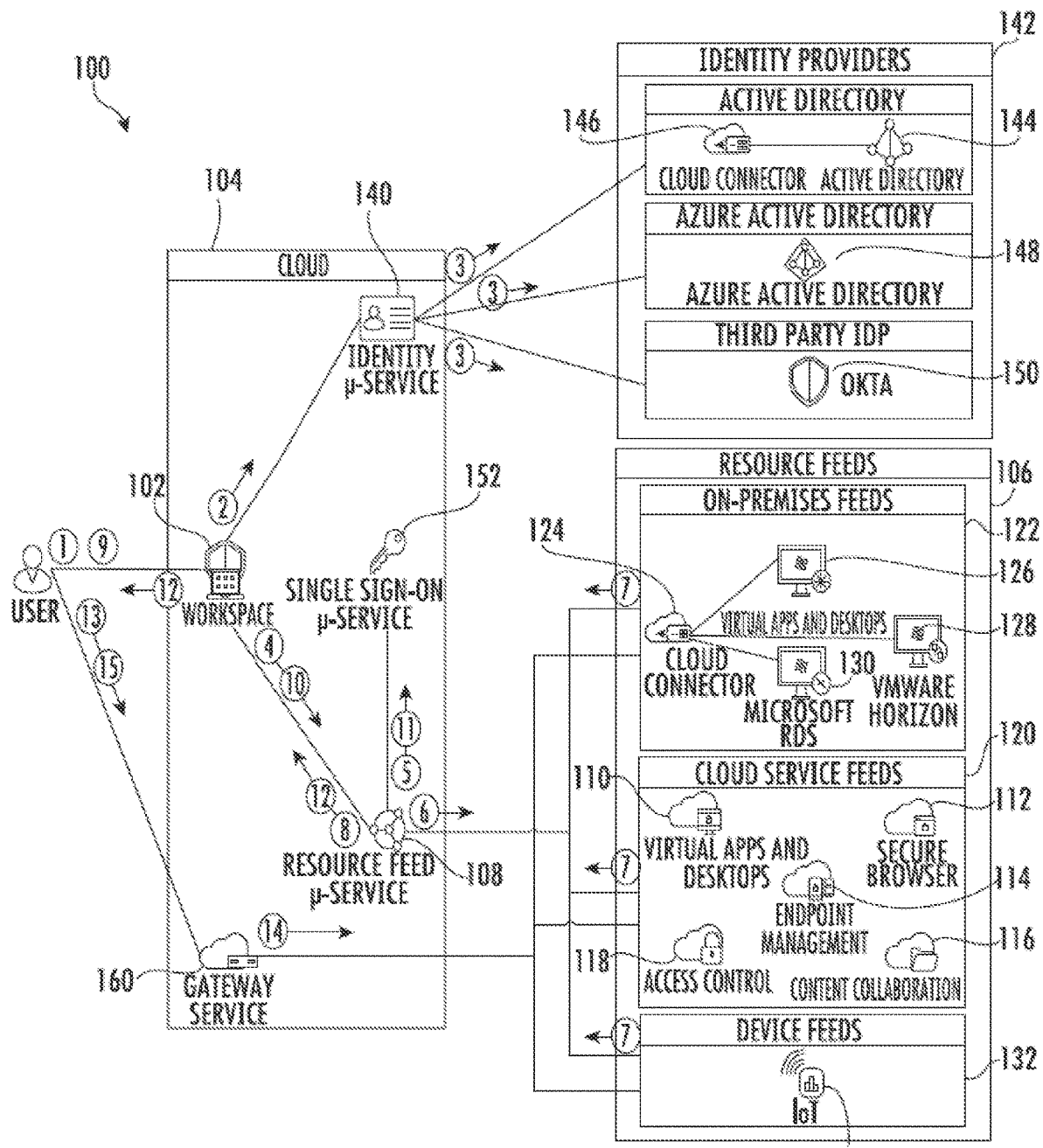
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
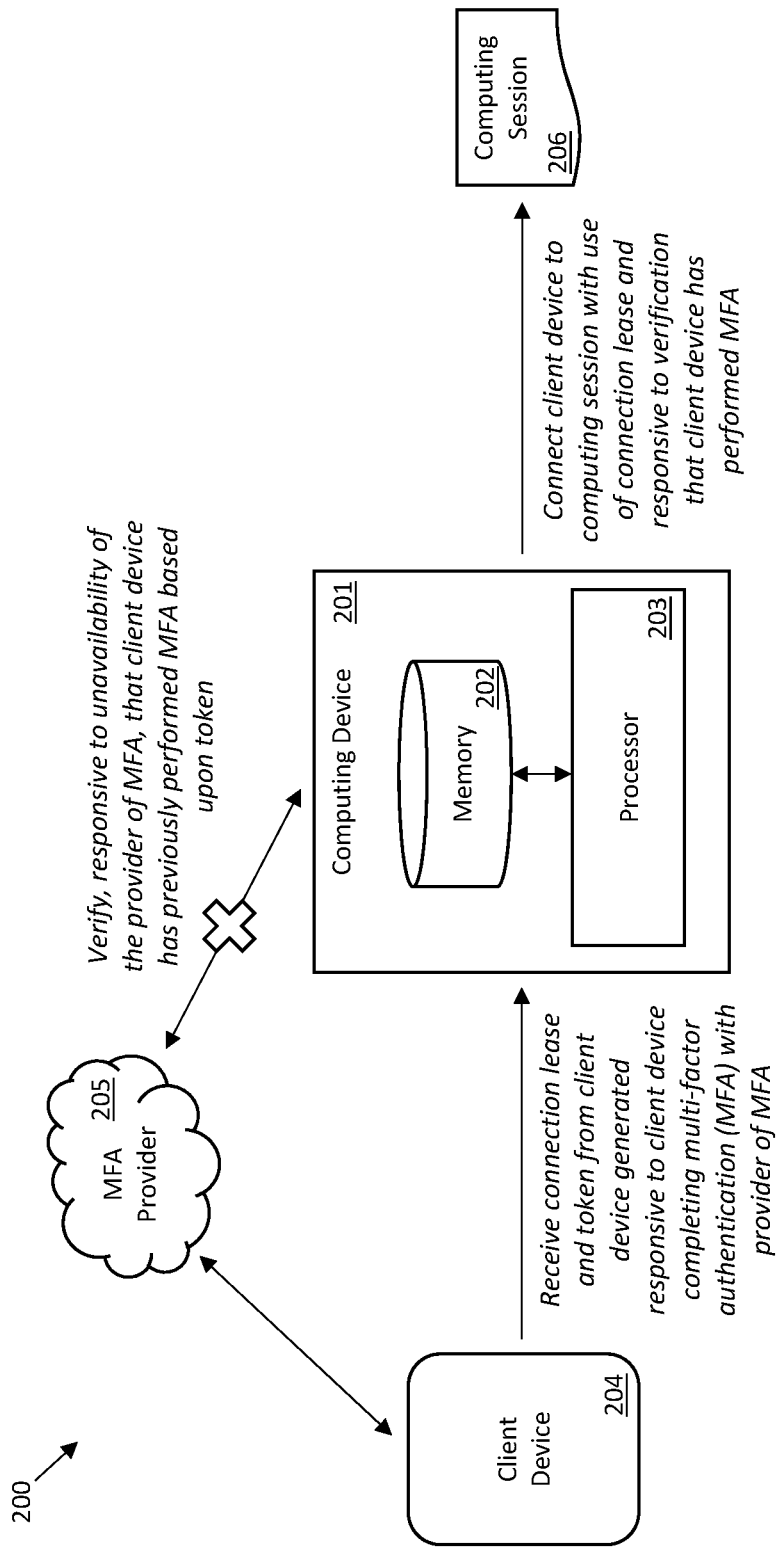
FIG. 6 is a schematic block diagram of a computing system providing multi-function authentication (MFA) verification in offline conditions in accordance with an example embodiment.

Turning now to FIG. 6, a computing system 200 illustratively includes a computing device 201 including a memory 202 and a processor 203 configured to cooperate with the memory to receive a connection lease and a token from a client (endpoint) device 204. The token is generated responsive to the client device 204 completing multi-factor authentication (MFA) with a provider of MFA 205. The processor 203 further verifies, responsive to unavailability of the provider of MFA 205, that the client device 204 has previously performed MFA based upon the token, and connects the client device to a computing session 206 with use of the connection lease and responsive to the verification that the client device has performed MFA.

An example architecture in which the system 200 may be implemented is now described with reference to a computing system 250 of FIG. 7. More particularly, the computing system 250 provides access to virtual sessions based upon connection leases. In the illustrated example, the connection lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace (CWA), and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

Figure 7:
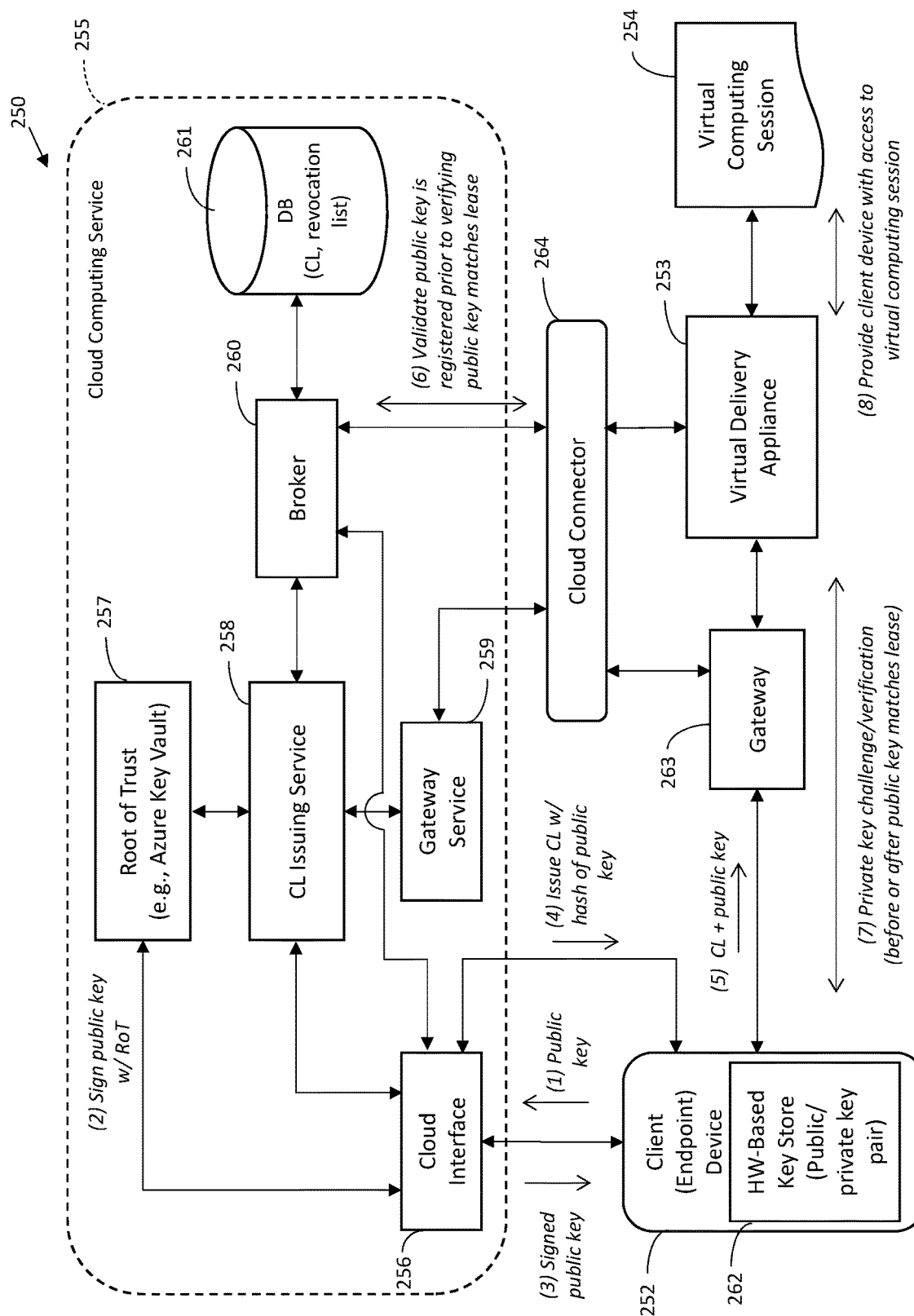
FIG. 7 is a schematic block diagram of a connection lease architecture and independent flow sequences in which the system of FIG. 6 may be implemented in accordance with an example embodiment.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to the legacy virtual delivery appliance 204 described above. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing. However, because the legacy virtual delivery appliances 204 described above with reference to FIG. 6 are not configured for such connection lease exchanges, these advantages would not otherwise be possible while using such legacy appliances.

Connection leases (CLs) provide long-lived, mostly static entitlements to published resources. Furthermore, Progressive Web App (PWA) Service Worker caching, which may also be used within the above-described architecture, allows for Web-based user interface (UI) (e.g., the Workspace UI) to be functional even in offline or degraded network conditions. In an example implementation, the system 250 will support native CWA apps. However, a significant amount of users may utilize a browser for the Workspace/StoreFront store 256, but also have a native CWA instance installed on the endpoint device 252, so that following the launch within the browser (Workspace Store) window, the native HDX Engine is invoked with the downloaded ICA (connection descriptor) file. This use case may be considered a "hybrid" case. This approach helps ensure familiar user experience (UX) with the browser and at the same time better HDX performance (e.g., for graphics, multimedia) and feature set (e.g. Smart Card, USB, Seamless Windows) compared to using an HTML5 HDX Engine in the browser.

There are also some use cases where no native CWA components are installed on the endpoint device 252. This is a zero-install configuration where both the Workspace Store 256 and the HDX Engine (HTML5-based) reside within the browser. This use case may be considered a "pure" browser case.

In both of these cases, the user authentication context is in the browser, and using a browser has unique challenges. For example, the browser does not offer the same level of security for asset storage as a native CWA instance, such as: access to the TPM, storage of private/public key pairs, signed public keys, Connection Leases (CL), Gateway Connection Tickets (GCT), Long Lived Auth Tokens (LLAuthT), Polymorphic Auth Tokens (PAuthT) for single sign on (SSOn) into HDX, etc. Another challenge is that the browser does not offer the same level of persistence, e.g., the browser could be configured to clear the cache upon exit, including device reboot.

Furthermore, the browser has a limited lifetime, in that it can be closed by a user after a brief use. This diminishes the opportunity for background operations that are important for resiliency, e.g., periodic download of CLs, which may otherwise be performed by a native app. Browsers may also have a significant attack surface, and access to native (raw) sockets is generally limited. More particularly, Web browsers have a significant attack surface by design, since they are used to access external websites (typically not under the control of an organization). This is why most modern browsers generally implement a sandbox to limit access to the operating system native APIs (including native sockets). As a consequence, it makes it difficult to access the native OS APIs which we need for the hybrid case described above (i.e., to communicate the native CWA components) or the zero-install case noted above (for which the HDX Engine is HTML5-based). In the zero-install case, the HTML5-based HDX Engine (the CWA is entirely running in the browser context) needs to communicate over the CLXMTP protocol with other components like the Gateway 263 or the Connector 264/VDA 253. CLXMTP typically runs directly over TCP (or UDP) transport protocols and this requires to use native sockets which might not be accessible (depending on the browser sandbox). The HTML5-based HDX Engine may use WebSockets to communicate with other components (there is no restriction for CLXMTP to use WebSockets as its transport protocol), but this would require the other components (e.g. Gateway 263, Connector 264/VDA 253) to also implement/use the WebSockets protocol (i.e. open a listener for WebSocket connections, accept WebSocket connections, etc.f). Although WebSockets can be used to channel protocols such as secure connection lease protocols (which will be discussed further below), this requires adding WebSocket support to multiple backend systems such as Gateway 263, Connector 264, and VDA 253, which bears a higher engineering cost.

In addition, with the browser there is no "user" awareness, which makes kiosk support for usage by multiple users on a shared kiosk device or terminal difficult and potentially unfeasible. By design, current Web browsers (Chrome, Edge, etc.) run in the context of a user's session on the underlying OS. For instance, if a user logs on to Windows and launches a Chrome instance, the Chrome instance runs in the context of the user's logged on session. If the user's session is logged on for a shared account to be used in the context of a kiosk, the browser does not provide much functionality to distinguish between the users of the kiosk. For example, each user of the kiosk can authenticate to the HTML5 CWA (i.e., logging on to Citrix Workspace after walking to a kiosk, but not logging on to Windows because the shared account is already logged on). The HTML5 CWA could use HTML5 Web Storage to store data. However, HTML5 Web Storage has no concept of user differentiation, meaning that the available storage would have to be explicitly subdivided per kiosk user. This could be challenging to do, especially from a security point of view. Furthermore, security, resiliency and performance of components such as UI caching, keys, CLs and various other user-device-bound tokens is important to maintain to prevent unauthorized access to the system. Moreover, it may also be desirable to enable multi-user, multi-store and kiosk (shared terminal) use cases.

Figure 8:
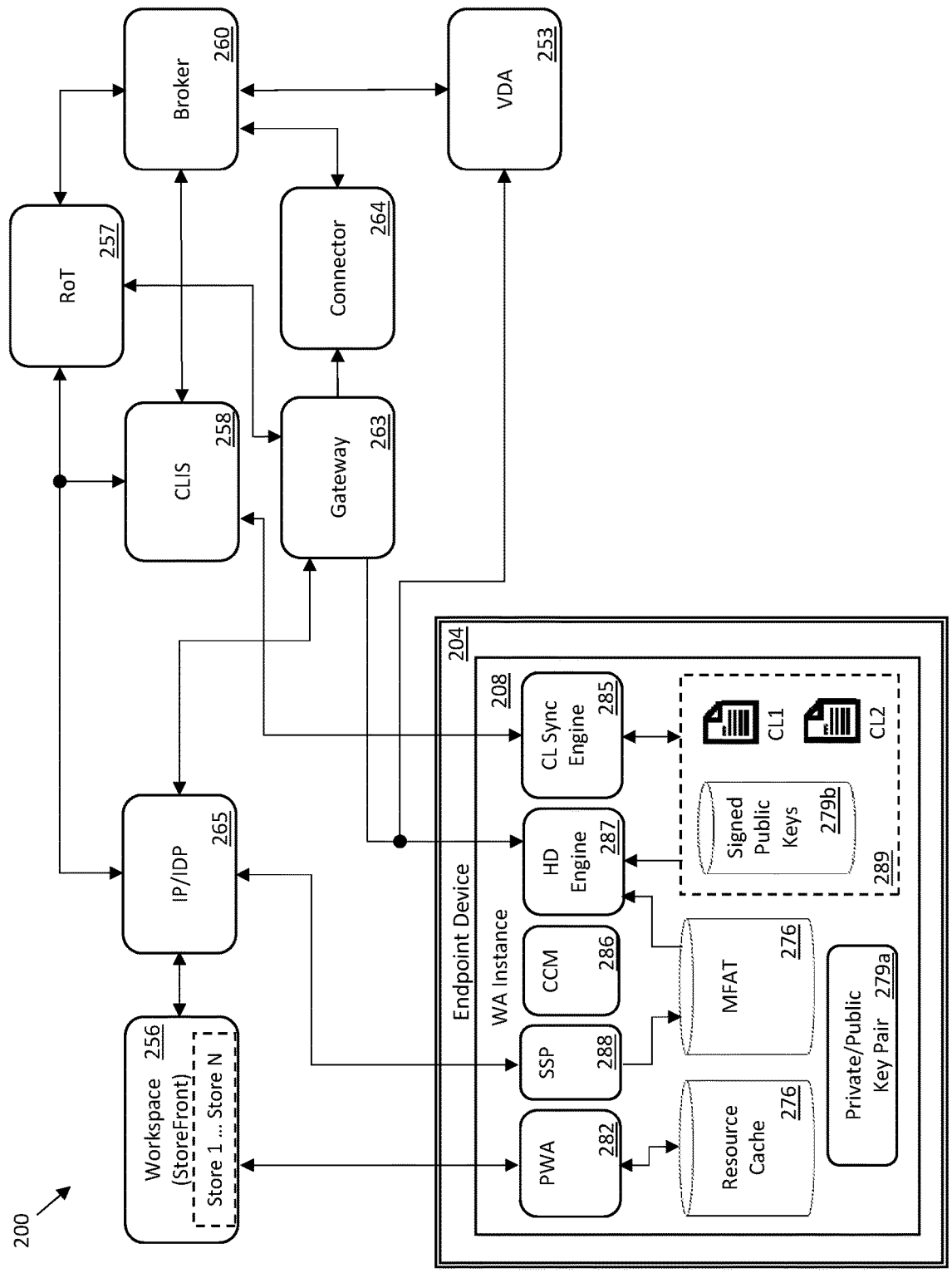
FIG. 8 is a schematic block diagram of an example implementation of the system of FIG. 6 within the connection lease architecture of FIG. 7.

Turning to FIG. 8, an example implementation of the system 200 which is implemented using the connection lease infrastructure set forth in FIG. 7 is now described. The following is a table of abbreviations which will be used in the description of the system 200.

| Abbreviation | Meaning |
| --- | --- |
| IP | Identity Platform which may provide its own Identity Provider (IDP) but can also integrate with third party IDPs or other identity systems. |
| CL | Connection Lease |
| CLIS | Connection Lease Issuing Service |
| CLXMTP | Connection Lease Exchange and Mutual Trust Protocol |
| WA | Workspace App |

-continued

| Abbreviation | Meaning |
| --- | --- |
| DSAuthT | DS Authentication Token (primary unless otherwise specified as secondary for specific service) |
| DS Auth | Delivery Services Auth |
| FIDO2 | Fast Identity Online 2 |
| IDP | Identity Provider |
| OIDC | OpenID Connect |
| MFA | Multi-factor Authentication |
| RP | Relying Party |
| SSOn | Single Sign On |
| TOTP | Time-based One-time Password |
| WS | Workspace |
| WSP | Workspace Platform |
| CLS | Connection Lease Service |

In the illustrated example, the endpoint device 204 runs a native WA instance 208. The native WA instance 208 illustratively includes a common connection manager (CCM) 286 and a high definition (HD) connection engine 287 for communicating with a gateway 263, connector 264, and/or VDA 253 to access virtual resources (e.g., virtual apps/desktops, SaaS/DaaS servers, etc.), as discussed further above. A Self-Service Plugin (SSP) 288 may perform calls home to the IP/IDP 265 and CLIS 258 on behalf of the WA instance 208. The endpoint device 204 further illustratively includes a PWA and in-app caching module 282 which interfaces with Workspace 256 and provides multi-feed resource awareness as well as a resource cache 276 for dynamic assets including published assets (such as virtual apps and desktops). The WA instance 208 further illustratively includes an MFA Token (MFAT) store 276, as well as key store 279a for the public/private key pair of the endpoint device 204. A cache 289 provides a key store 279b for signed public keys of other components (e.g., VDA 253, Gateway 263), and CL storage, for the HD engine 287 and CL synch engine 285.

In the present example, the MFA Token (MFAT) serves as evidence of recent successful MFA by the endpoint device 204. The MFAT may take the form of a signed JSON object similar to a CL or Gateway Connection Ticket (GCT). In addition to JSON as the data format for CLs and GCTs, other options may include binary (e.g. ASN.1 with BER), XML or any format for structured data. The MFAT must to be signed or it would not be trustable. The MFAT is user-device bound, and may include a user identity and endpoint public key thumbprint, similar to a CL or GCT. In the present example, MFATs may be issued by IP/IDP 265 following MFA and signed by an IP private key. An IP/IDP 265 public key signed by the RoT 257 may also be included with the MFAT, for example. In an example embodiment, an MFA expiration time is set (e.g., 60 minutes) plus an optional grace period (e.g., 30 minutes), although different times may be used in different embodiments.

In some embodiments, an optional payload may also be included, e.g., with additional policies (not encrypted), or user TOTP secret key (encrypted), as will be discussed further below. The MFAT may be retrieved synchronously with the MFA flow, as opposed to a background CL plus keys sync. Resource CLs may optionally include an MFA policy requirement, that is, indicating that an MFAT is required along with the resource CL. This helps avoid the need to push MFA policies to the gateway 263, connector 264, VDA 253, or other components (any of which may serve as the computing device 201 shown in FIG. 6). Instead, the policy is included in the CL. However, it should be noted that in some embodiments, MFA policies may in addition or instead be pushed to the gateway 263, connector 264, and/or VDA 253 to provide the ability to change MFA policies in real time. Otherwise, CL policies would be more static because CLs are typically issued for 1-30 days.

The CLIS 258 may read MFA policies to include in resource CLs it generates. The gateway 263, connector 264, and/or VDA 253 enforce MFA tokens based on instructions in the resource CL. MFAT signatures are validated based upon the IP/IDP 265 public key included in the signature which is signed by the RoT 257, and then validated with the included public key. The expiration of the MFAT may then be checked to ensure that MFA has been recently performed by the endpoint device 204. Furthermore, a check may also be performed to ensure that the user-device identity in the MFAT matches that of resource CL, and also matches the public key used in a trusted CL exchange protocol.

Using the above-noted example, the duration of outages may range from [grace period (30 min)] as a minimum to [MFA time (60 min)+grace period (30 min)] as a maximum. In other words, in the worst-case scenario, MFA was performed, and approximately 59 minutes later right before the next MFA challenge an outage occurs. Then the MFA token is valid for another approximately 31 minutes.

Various enhancements may be used in different implementations. One enhancement is to enforce MFA for external access only. More particularly, a policy in the CL may dictate that the MFA token requirement is applied for external connections, but not for direct connections internal to a computing environment or network. By way of example, this may be enforced at the Gateway 263 and optionally at the Connector 264. This means that resiliency of direct connections is not impacted at all, e.g., the service level agreement (SLA) could be 0.9999 for direct connections and 0.995 for external connections plus MFA (although other metrics may be used in different embodiments).

In accordance with another implementation, the availability of a Gateway Service 259 connection implies that there are no issues with the user's Internet. So, this allows for a focus on IP/IDP 265 health-checks. Furthermore, since the endpoint device 204 is typically not to be trusted, the Gateway 263 may perform the IP/IDP 265 health checks instead. According to an example CL policy, if the IP/IDP 265 is down, the grace period encoded in the MFAT may then be used, e.g. 30 minutes. Otherwise, if the IP/IDP 265 is up, the grace period is not allowed. In an alternative arrangement, the grace period encoded in the MFAT may always be allowed, but if the IP/IDP 265 is down, then allowance may be provided for an extended grace period, e.g., 60 minutes (although other durations may also be used). In yet another option for CL policy, unlimited grace period usage may be allowed so long as the IP/IDP 265 is down.

Another optional enhancement is deferred MFA policy application. That is, a connection may be allowed to proceed and the user allowed to log into a session, but then a deferred MFA policy is applied. The deferred MFA policy may be applied after a grace period (e.g., an additional 15 minutes), or when the IP/IDP 265 is known to be healthy again, whichever comes first. If after the grace period expires the IP/IDP 265 is still down, the user may be warned that the connection will be dropped, and then Gateway 263 drops the HD connection. If the IP/IDP 265 becomes healthy before the grace period expires, the Gateway 263 sends an MFA authentication request to the WA instance 208. The WA instance 208 attempts MFA authentication and, if successful, obtains a new MFAT. The WA instance 208 provides the new MFAT to the Gateway 263. This may be done by re-running CLXMTP over an HD connection with the CLs and the new MFAT. Alternatively, the MFAT may be sent via a Common Gateway Protocol (CGP) and validated at the Gateway 263 based on the stored endpoint thumbprint and CL policies from a gateway connection ticket (GCT). After CL and MFAT validation, the HD connection is allowed to continue. The policy may optionally have additional details, e.g., if connecting from the same client IP, allow the connection for a longer grace period.

It should be noted that the approaches discussed herein will also work with CLs being the preferred code path, that is, they may be also be used in online conditions in that they provide for improved security through MFA verification in outage conditions in addition to resiliency. In some implementations (e.g., on-premises), some organizations use MFA for direct/internal connections in addition to external connection. In such cases, the Connector 264 and/or VDA 253 may perform the equivalent of the IP/IDP 265 health checks that the Gateway 263 performs, for example. IP/IDP 265 health checks may be made more robust by crowdsourcing, e.g., by tracking if users are successful with MFA, or by sharing health checks performed by other Gateway Points of Presence (PoPs), etc.

In accordance with another example, an HD session may be allowed with a reduced or restricted access. A downside of deferred policy application is that in some scenarios enough damage may be done by a malicious actor after initially logging in. One option is to (temporarily) restrict the access level, e.g., in an HD Windows session, similar to Kerberos constrained delegation. Instead of allowing full access to the session, the VDA 253 could restrict user access in outage mode when online MFA is not possible. Full access may be restored after deferred MFA policy application and obtaining a new MFAT. If a deferred policy cannot be applied within a grace period, the session may be disconnected. Some of the restrictions may include: using Windows AppLocker polices to restrict applications that are allowed to be open; and preventing network access for the user SID, in which case the VDA 253 could reduce the access given to logon SID to remove a lot of privileges. Security policies may also be evaluated with evidence from the logon using Smart Access tags in some embodiments. In accordance with one example implementation: Windows OS restrictions may restrict access to network shares; contextual HD connection policy restrictions may tie with Smart Access tags including Content Data Model (CDM), clipboard, Drag-and-Drop, etc.; and restriction of double-hop access may be restricted.

Policy Tokens (PT) with more real-time context evaluation (e.g., for user activity, endpoint 204 analysis) can be used to enable a more dynamic MFA policy control without updating CLs or MFATs in some embodiments. More particularly, the policy token can be generated and updated frequently based on user activity (e.g., user is active versus idle and not accessing resources), endpoint analysis (IP address in known range, anti-virus software installed, etc.), device registration, and managed versus unmanaged devices. In addition, MFA policies may have different tiers. The most appropriate tier may be selected based on user context. This may include push mechanisms for PT from CLIS 258 to help ensure real-time or close to real-time delivery. The PT may complement the static policy in the resource CL. Further, the CL may include policy tiers specifying different categories of security restrictions, e.g., duration of the grace period, deferred policy update, etc. Also, the Gateway 263 and Connector 264 may use a PT as a selector into the different tiers in the resource CL.

MFATs are designed to be used as evidence of recent MFA, and it may be sent by the WA instance to the Gateway 263 and/or Connector 264 even after it has expired. Additional secondary "evidence" may be used for the Gateway 263 and/or Connector 264 to allow a connection without MFA. For example, this may be done for an IP address associated with previous connections (stored by the Gateway 263). Latency may be another secondary evidence of MFA, e.g., a latency that is consistent with prior sessions which may be indicative of the user being in a same geographical location. Such types of evidence may similarly be applied in selecting different CL MFA policies.

Time-based One-time Password (TOTP) is one technique for generating MFA codes supported by Citrix Cloud, Google Authenticator, and other vendors. TOTP works by creating a shared secret key per user, and it allows both the client and server to generate the same MFA code using a hash function given the same secret key and synchronized clocks. In an outage of IP/IDP 265, another component such as the VDA 253 could perform MFA, provided it has the TOTP secret key for the user. The benefit of such an approach would be the that user experience remains fairly consistent—the user would login with the same MFA code that they would normally use for authentication. Various approaches may be used for providing the secret key to the VDA 253, one of which includes storing the TOTP secret key in the lease. Another approach is to encrypt the TOTP secret key with the VDA's public key before storing it in the lease. Still another approach is to cache TOTP secrets on the local host cache. Storing a second copy of the TOTP secrets provides redundancy against failure.

In accordance with another example approach, the secret TOTP key may be secured in the MFAT. More particularly, the symmetric key may be encrypted with the VDA 253 public key, or with a Broker 260/Connector 264 public key. This prevents the endpoint 204 from seeing the secret key, but the VDA 253 is able to do so. The IP/IDP 265 encrypts the TOTP secret key with symmetric key, and encrypts the symmetric key with both the Broker 260 and Connector 264 public keys. The two instances of the encrypted symmetric keys are included in the MFAT. Upon establishing a connection via CLXMTP, the VDA 253 contacts the Broker 260 (when the Broker is online) or Connector 264 (when the Broker is offline) with a request to decrypt respective instances of the symmetric key. The VDA 253 then uses the decrypted symmetric key to decrypt the TOTP Secret Key and log the user in.

Another option for communicating the TOTP secret key is similar to the approach described above, but the symmetric key is instead encrypted with multiple Gateway PoP public keys. The Root of Trust (RoT) 257 already has all the Gateway PoPs public keys, so it can provide them to IP/IDP 265. This would need to be done for all Gateway PoPs, and if there are many PoPs the MFAT could become relatively large. As an optional enhancement, location awareness may be used with help from a Network Location Service (NLS). NLS could provide a short list of Gateway PoPs, e.g., nearest PoP and a limited number of fallbacks. For example, if a user is in the US East coast, the public keys of the US East coast PoP and US central PoP could be used, or the public keys of all the PoPs in the US (as opposed to globally) could be used. Thus, the size of MFAT may be reduced. Upon establishing a connection via CLXMTP, the Gateway PoP receives the MFAT from the endpoint 204. The Gateway PoP is able to decrypt the symmetric key with its PoP's private key and then, after establishing CLXMTP with the resolved target VDA, the symmetric key is re-encrypted with the resolved VDA's public key. The VDA 253 is then able to decrypt the symmetric key with its VDA private key. The VDA 253 then decrypts the TOTP secret key in the MFAT payload using the symmetric key. The VDA 253 then securely stores the TOTP secret key. When an HD connection starts, the VDA 253 presents a TOTP authentication challenge to the user, using the TOTP secret key. If the user successfully answers the TOTP challenge, the VDA 253 logs the user into the session.

Since the VDA 253 is able to obtain the user TOTP secret key from the MFAT, the VDA could use a library (e.g., an open source TOTP library) to perform MFA for the user. This approach may be combined with a credential provider at the VDA 253 to achieve SSOn, or the user could be prompted for TOTP (6-digit MFA code). The credential provider asks for the TOTP and the domain credential to perform MFA. An advantage of the TOTP approach is that all cloud components could be down, except the Gateway 263 for Gateway (remote) connections, yet session access may still be grated with MFA assurance.

In accordance with another example implementation, FIDO2 may be incorporated to provide still further functionality. FIDO2 is the overarching term for FIDO Alliance's newest set of specifications. FIDO2 enables users to leverage common devices to easily authenticate to online services in both mobile and desktop environments. From a security perspective, FIDO2's cryptographic login credentials are unique across every website, never leave the user's device and are never stored on a server. This security model helps eliminate the risks of phishing, different forms of password theft and replay attacks.

Using biometrics helps solve end-user convenience and privacy concerns. Users unlock cryptographic login credentials with built-in methods such as fingerprint readers or cameras on their endpoint devices 204, or by leveraging easy-to-use FIDO security keys. Because FIDO cryptographic keys are unique for each internet site, they cannot be used to track users across sites. Plus, biometric data, when used, never leaves the user's device. Additionally, with respect to scalability, websites can enable FIDO2 through a JavaScript API call that is supported across leading browsers and platforms on billions of devices consumers use every day.

FIDO2 authentication to the VDA 253 may be facilitated with the MFAT. More particularly, a WA 208 user could authenticate with FIDO2 integrated with Workspace 256 and IP/IDP 265. In an example embodiment, the authentication process may include a first (one-time) step of new user registration and credential creation, in which a FIDO2 Relying Party (RP) sends a challenge and RP information. The endpoint 204 uses a secure platform authenticator module to verify the user. For example, a biometrics challenge may be performed (fingerprint, iris scan, etc.), e.g. using Windows Hello. A private/public key pair is generated in a TPM on the endpoint, and an attestation object (credential) is created and signed with the private key. The RP verifies and registers (stores in a database) the credential (public key, credential ID). At this point, the credential ID could be included in a MFAT by the IP/IDP 265, and the MFAT returned to the endpoint 204.

Subsequently, in an online mode, the user could authenticate to Workspace 256 and IP/IDP 265 using a normal FIDO2 flow. In offline conditions, the MFAT could provide the credential ID to the VDA 253 using the same mechanisms as described in the TOTP flow above. The VDA 253, with help from a credential provider, could perform an authentication challenge based on FIDO2 and the MFAT-derived credential ID, as follows. FIDO2 (WebAuthn) API redirection is perform over a HD connection. After requesting and receiving a challenge from the RP, the VDA 253 will use the MFAT-derived credential ID to build a client data hash and include it in the parameters for getting an assertion (client data hash, credential ID, RP and challenge info). The endpoint 204 may verify the user (biometrics, etc.), and use the supplied parameters to create and sign an assertion with its private key, then respond with the assertion to the VDA 253. Furthermore, the VDA 253 may authenticate with the signed assertion to the RP. The RP will fetch the stored public key using the credential ID and validate the signature of the assertion using the public key, validate the client info hash, and return success if all validations succeed. An advantage of this approach is that users will continue to use a familiar FIDO2-based auth, e.g., biometric auth with Windows Hello for both WS/IP authentication (in online conditions) and session authentication (in offline conditions).

In some embodiments, a form of local authentication may optionally be applied, e.g., a PIN or biometric. However, a local auth may not be the equivalent in complexity or strength (overall security policy or preference) to the cloud-service provided MFA. Furthermore, in some embodiments a cloud-based MFA may be implemented from the VDA 253. This would otherwise require MFA-related cloud services to be available, but could work if the endpoint device 204 Internet connection is down yet the VDA has no connectivity issues. Overall, each of the MFA options described above could be enabled based on a policy configuration to be selected by customers who may have specific requirements and preferences.

Another example approach may be implemented at the WA instance 208 as follows. Even when WSUI is in an offline mode (e.g., if Workspace 256 is down) or a specific Workspace resource feed is cached (e.g., if CVAD service is down), then based on a separate IP/IDP 265 health-check performed by WA 208, MFA may be run and applied. This approach will work for the user if WA 208 is online (Internet is available) and if IP/IDP 265 and MFA-related services are available. The behavior could be applied based on policy. Furthermore, in some embodiments the use of CLs may optionally be restricted based on successful MFA. This may be done to prevent the use of CLs by an advanced user who may be able to bypass the WA UI or recompile the WA code, etc.

Figure 9:
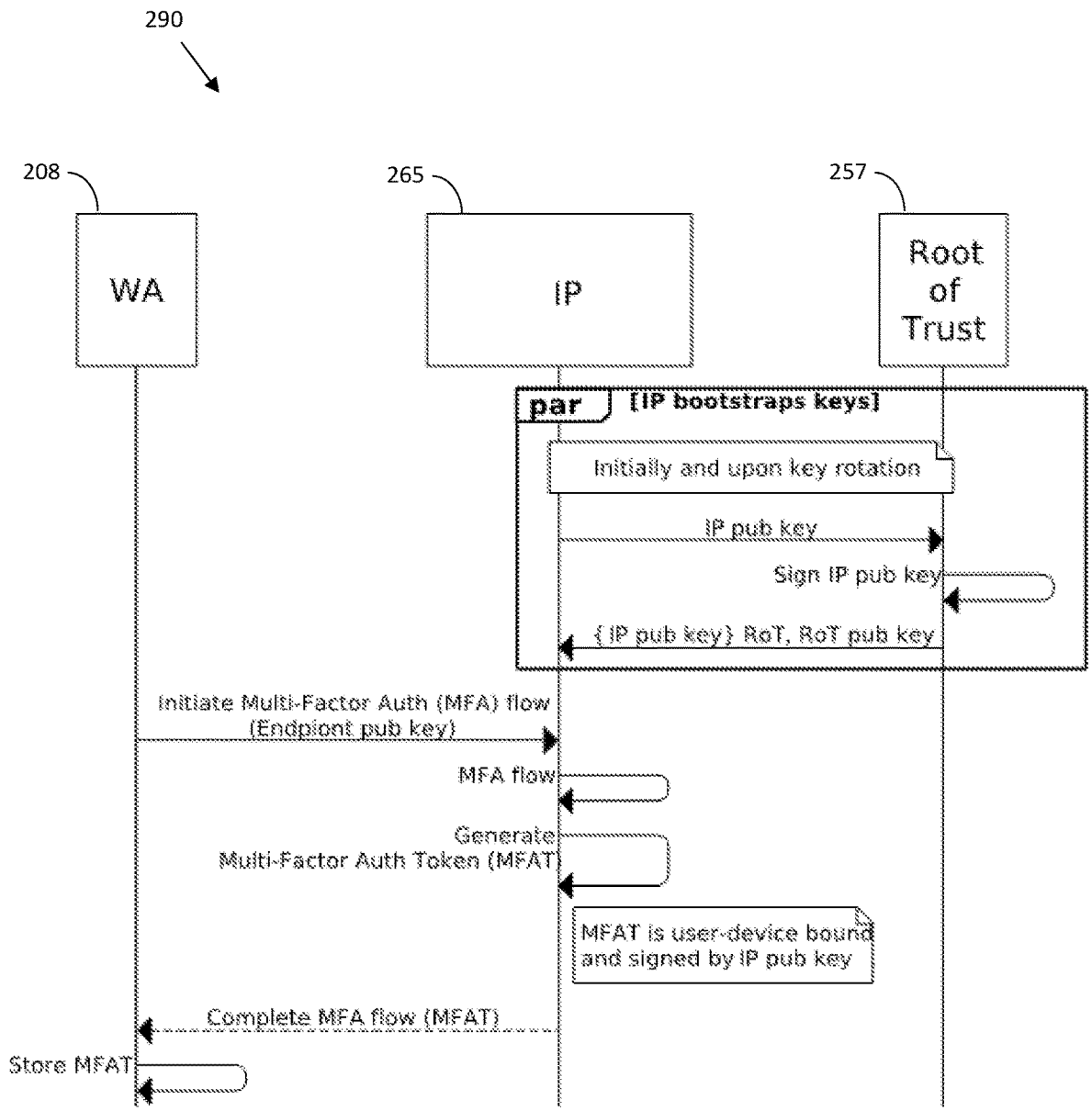
FIG. 9 is a sequence flow diagram illustrating an MFA token generation sequence which may be performed by the system of FIG. 8 in an example embodiment.

Turning to the sequence diagram 290 of FIG. 9, an example sequence flow for MFAT generation is now described. An authentication agent (here IP/IDP 265) performs IP key bootstrapping initially upon key rotation with the RoT 257 by having the IP public key signed by the RoT. This takes place in parallel with the MFA flow. The WA instance 208 initiates MFA with its endpoint public key, the MFA flow is performed by IP/IDP 265 to generate the MFAT (which is user-device bound and signed by the IP public key signed by the RoT 257), and the MFAT is returned to and stored by the WA instance.

Figure 10:
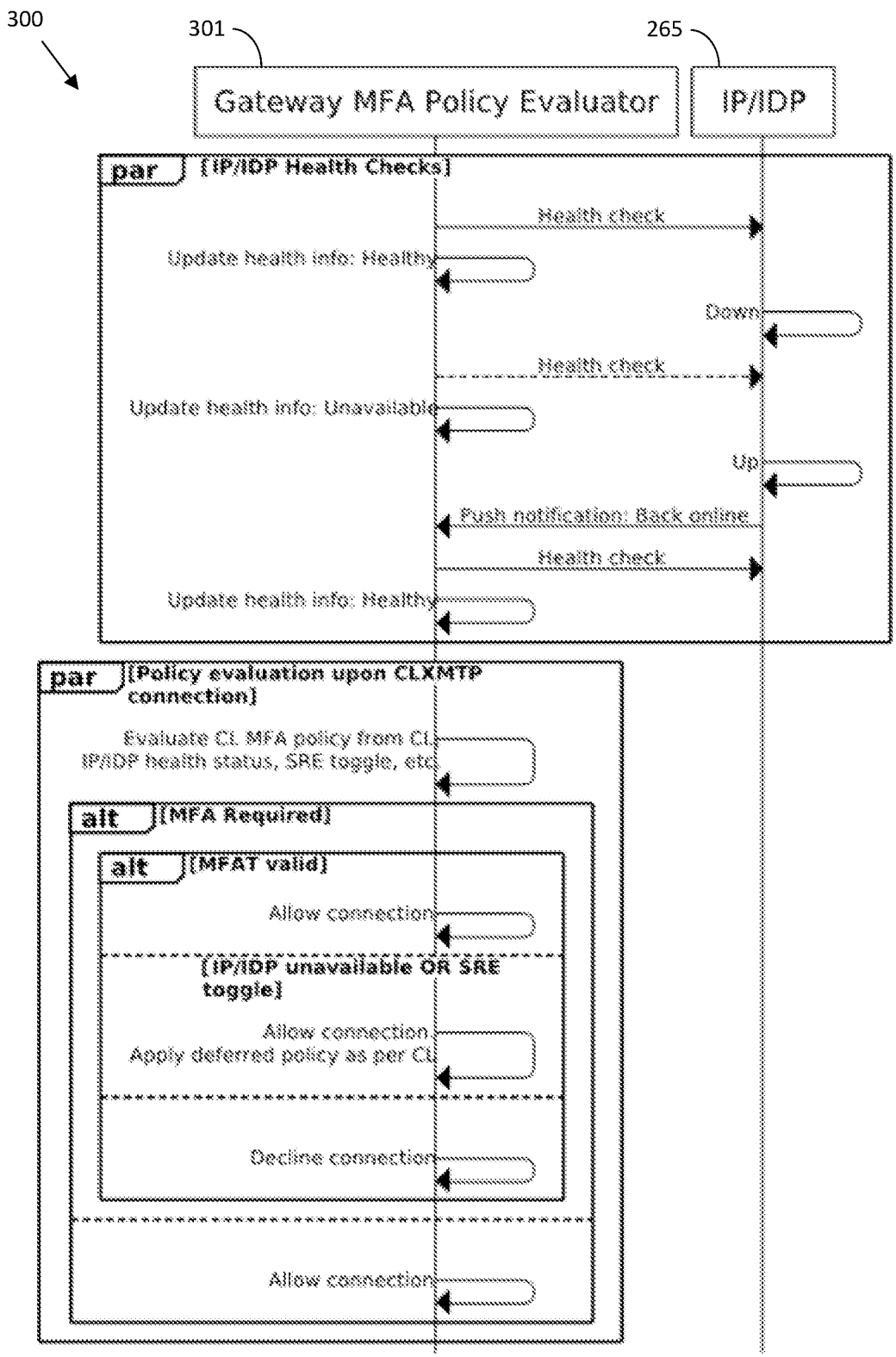
FIG. 10 is a sequence flow diagram illustrating a gateway policy evaluation sequence which may be performed by the system of FIG. 8 in an example embodiment.

Referring to the sequence diagram 300 of FIG. 10, a gateway policy evaluation sequence is now described. The gateway 263 communicates with the IP/IDP 265 to perform identity provider health checks, as discussed above. In parallel with the health checks, the gateway 263 performs policy evaluation responsive to the CLXMTP connection. This includes an evaluation of CL MFA policy from the CL, as well as of the IP/IDP 265 health status. Evaluating the MFA policy (with the input from a MFA policy section in the CL, the health of the Identity Provider (IDP), etc.) is what allows the Gateway 263 to decide to accept or reject the MFA. For instance, the policy could validate the window of time for which a previously created MFAT will be accepted, decide to reject the MFAT if the IDP status is reported as healthy (because the user should be able to redo a successful MFA), reject the MFAT if the origin IP address is not recognized, etc. As also discussed above, a check may optionally be performed to determine if MFA is required (e.g., external vs. internal connection), as well as to determine if the MFAT is valid, as also discussed above, prior to allowing the connection.

Figure 11:
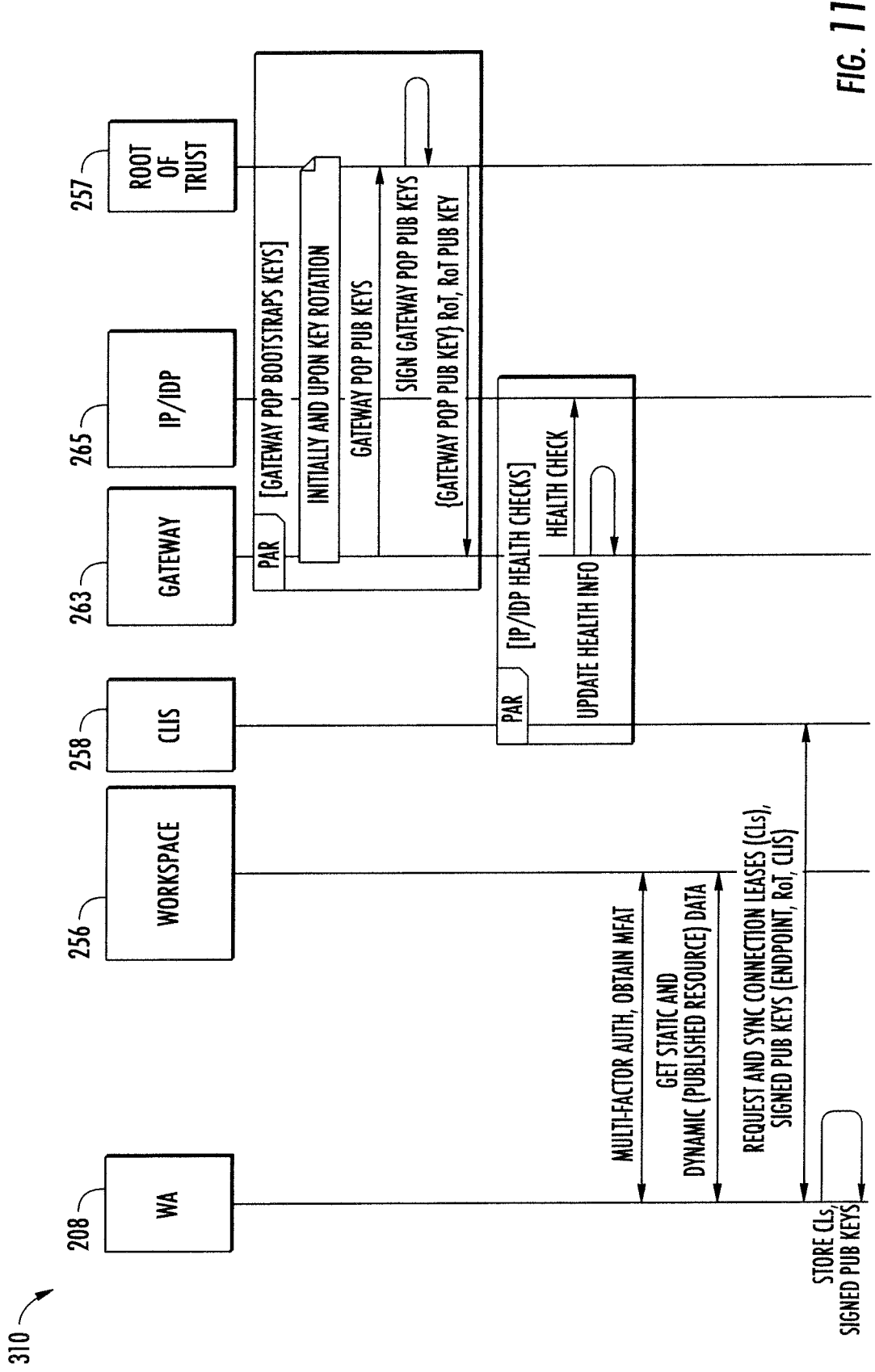
FIG. 11 is a sequence flow diagram illustrating a first portion of a launch sequence with connection leases and MFA token which may be performed by the system of FIG. 8 in an example embodiment.

Turning to the sequence diagram 310 of FIG. 11, a first portion of a launch with CLs and MFAT is now described. The gateway 263 and RoT 257 perform a gateway PoP key bootstrap operation, in parallel with the gateway performing IP/IDP 265 health checks, as discussed above. The WA instance 204 communicates with Workspace 256 to obtain the MFAT, status and dynamic (published resource) data, and then communicates with the CLIS 258 to request and sync CLs and signed public keys for the endpoint device 204, RoT 257, and CLIS. The WA instance 204 stores the CLs and keys in the cache 289, as noted above.

Figure 12:
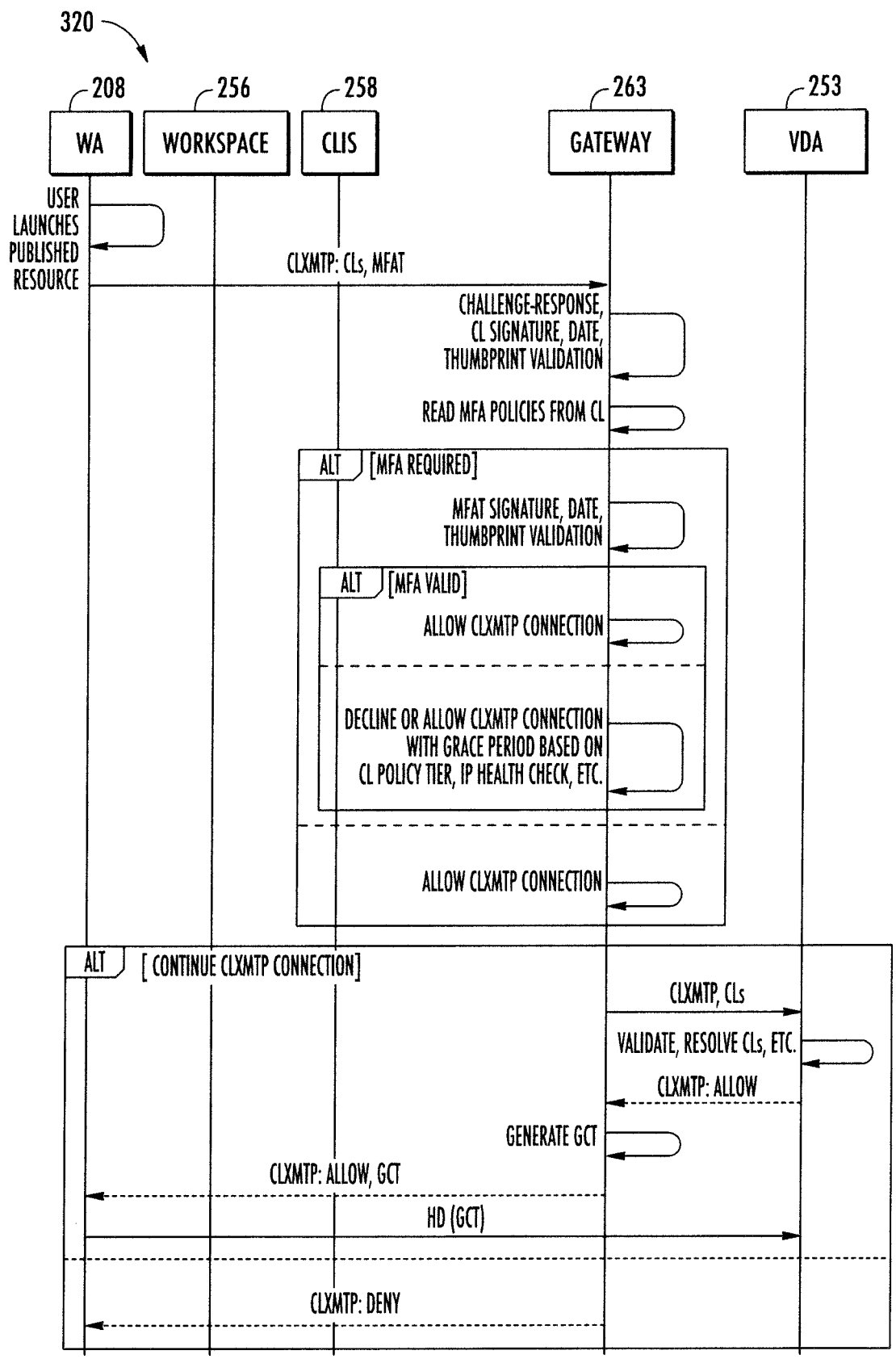
FIG. 12 is a sequence flow diagram illustrating a second portion of the launch sequence of FIG. 11.

In a second portion of the launch sequence shown in the sequence flow diagram 320 of FIG. 12, when a user launches a published resource from the endpoint device 204, a CLXMTP connection is opened with the gateway 263 based upon the appropriate CL and MFAT. The gateway 263 performs a challenge-response based upon the CL signature, date, and thumbprint validation, and optionally reads the MFA policies from the CL. In some embodiments, the gateway 263 may also perform MFAT signature, data, and thumbprint validation, allow/decline the CLXMTP connection with a grace period based upon a CL policy tier, IP/IDP 265 health check, etc., as discussed further above. Alternatively, the gateway 263 may open a CLXMTP connection with the VDA 253, with validates and resolves the CLs, and the gateway generates a GCT and allows the WA instance 208 to initiate an HD connection with the VDA.

Figure 13:
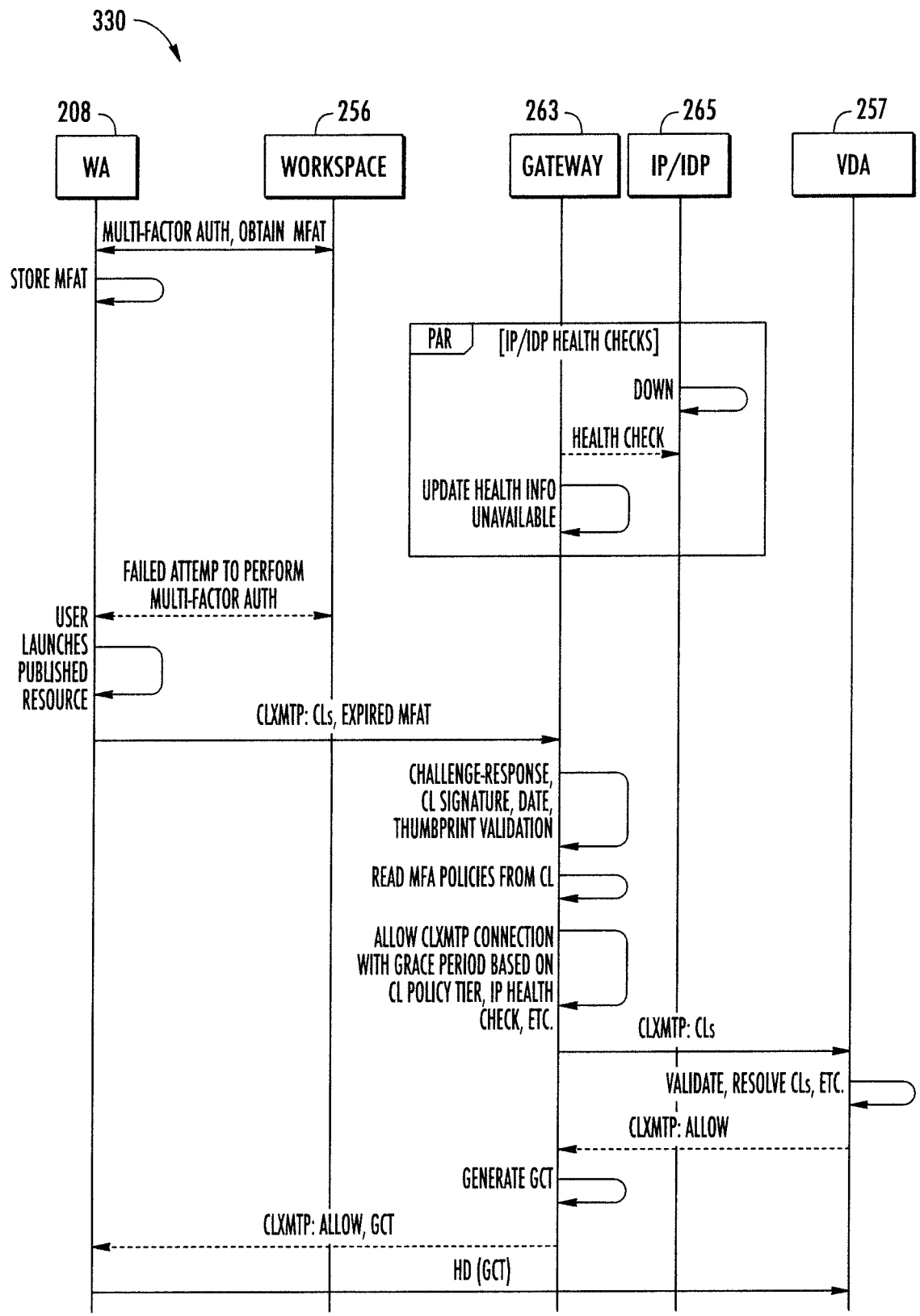
FIG. 13 is a sequence flow diagram illustrating a launch with connection leases and an expired MFA token with a grace period during an offline condition which may be performed by the system of FIG. 8 in an example embodiment.

A launch with CLs and expired MFAT and a grace period when IP/IDP 265 is down is now described with reference to the sequence diagram 330 of FIG. 13. The WA 208 performs MFA with Workspace 256 to obtain and store an MFAT. In parallel, the gateway performs IP/IDP 265 health checks. Notwithstanding a subsequent failure of the attempted MFA with Workspace 256, a user launches a published resource from the WA instance 204. A CLXMTP connection is opened from the WA instance 208 to the gateway 263 with the appropriate CL(s) and expired MFAT. The gateway 263 performs a challenge response based upon the CL signature, date, and thumbprint validation, reads the MFA policies from the CL, and allows the CLXMTP connection with a grace period based upon the CL policy tier and identity provider health check. The gateway 263 opens a CLXMTP connection with the VDA 253, which validates and resolves the CLs, generates a GCT, and the gateway allows the WA instance 208 to initiate an HD connection with the VDA.

Figure 14:
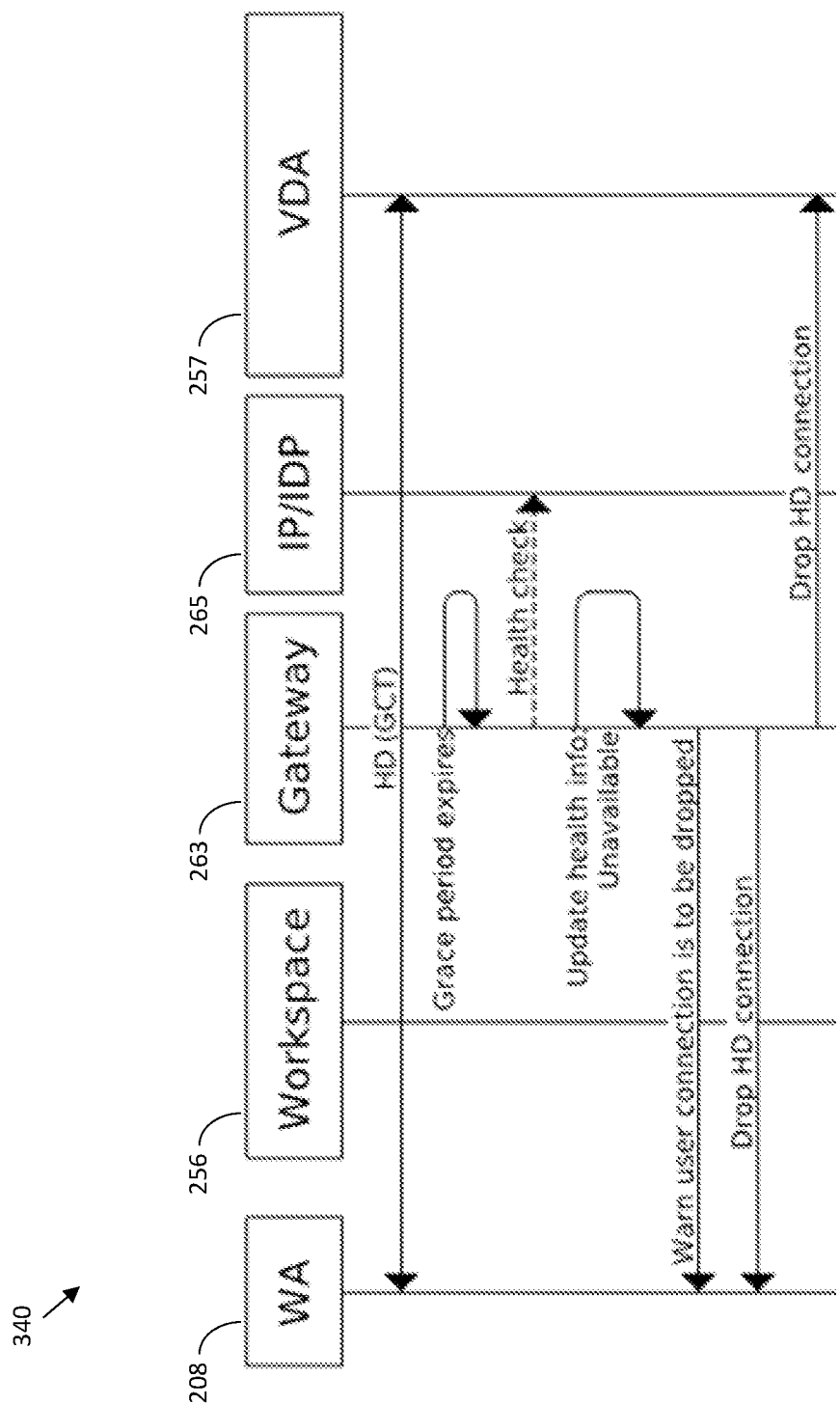
FIG. 14 is a sequence flow diagram illustrating a deferred policy update sequence which may be performed by the system of FIG. 8 in an example embodiment.

A deferred policy update when the IP/IDP 265 is down is now described with reference to the flow diagram 340 of FIG. 14. A session is established between the WA instance 208 and VDA 257 as discussed above. When the gateway 263 determines that the MFA grace period has expired, it performs a health check of the IP/IDP 265. When it is determined that the health information is not available (e.g., the IP/IDP 265 is offline or unavailable), the gateway 263 sends a warning to the user that the connection is about to be dropped, and shortly thereafter the HD connection is dropped.

Figure 15:
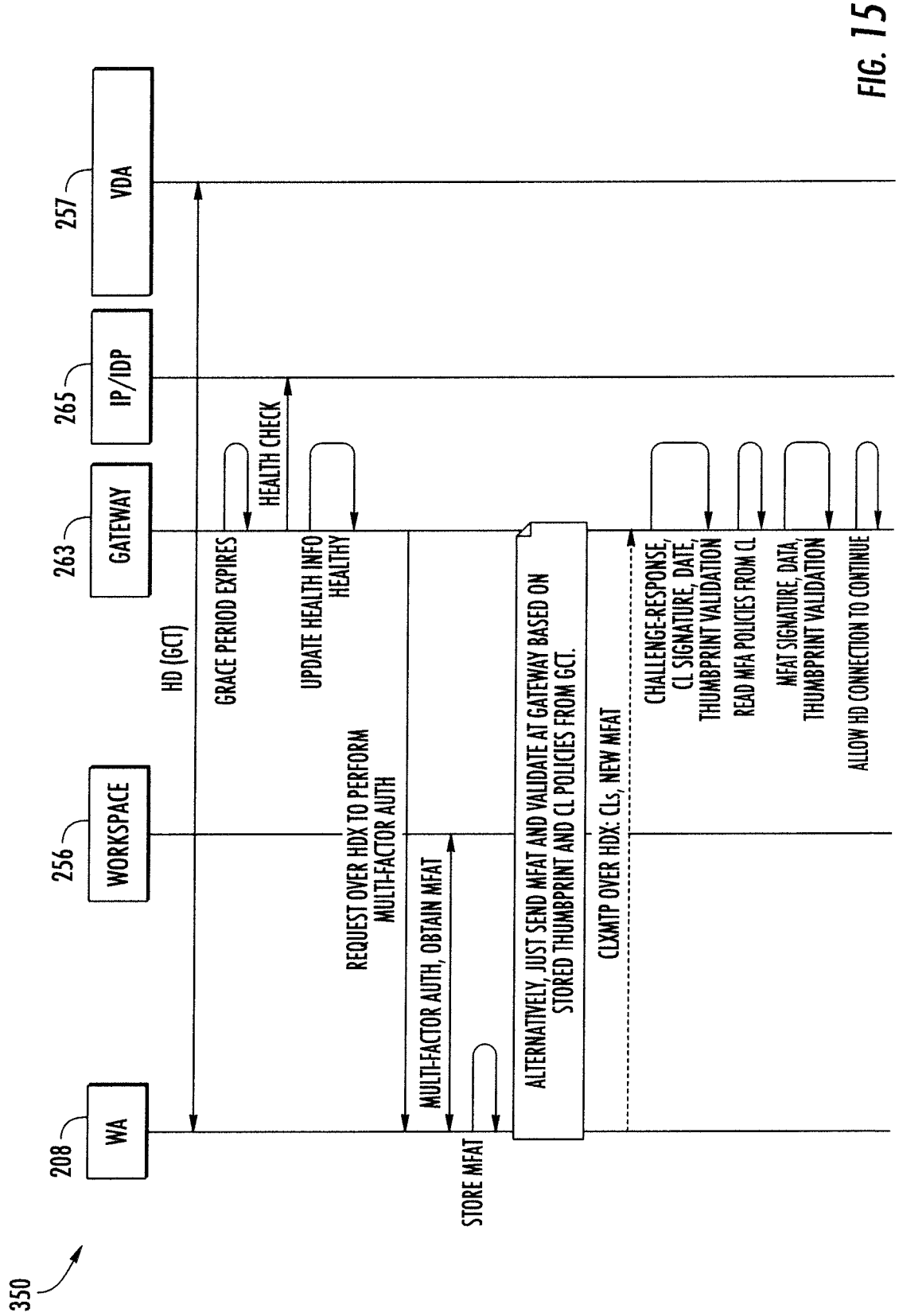
FIG. 15 is a sequence flow diagram illustrating a deferred policy update sequence in online conditions which may be performed by the system of FIG. 8 in an example embodiment.

Furthermore, a deferred policy update when the IP/IDP 265 is up is now described with reference to the sequence flow diagram 350 of FIG. 15. The steps are the same as in the sequence 340 until a healthy health check status is returned from the IP/IDP 265, at which point the gateway 256 requests the WA instance 208 perform MFA over an HD connection, which the WA instance then does with Workspace 256 and stores the MFAT. Alternatively, the WA instance 208 may just send the MFAT and validate it at the gateway 263 based on the stored thumbprint and CL policies from the GCT, as discussed further above. A CLXMTP connection is initiated over an HD connection based upon the CL(s) and new MFAT, and the gateway 263 performs a challenge-response, reads the MFA policies from the CL, and performs MFAT signature, date and thumbprint validation. If they are all validated, the gateway 263 allows the HD connection to continue.

Figure 16:
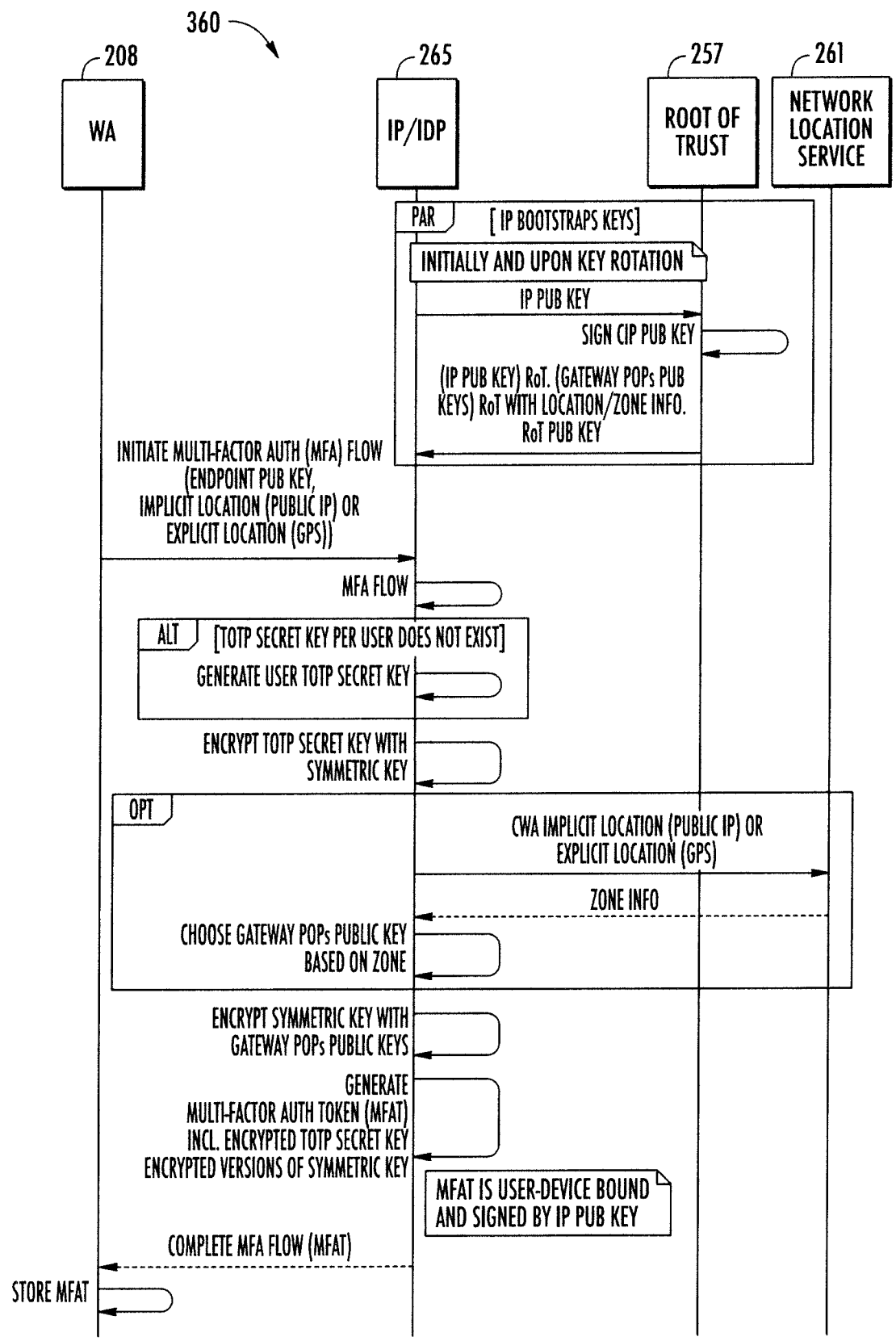
FIG. 16 is a sequence flow diagram illustrating an MFA token generation sequence with a Time-based One-time Password (TOTP) secret key which may be performed by the system of FIG. 8 in an example embodiment.

Turning now to the sequence flow diagram 360 of FIG. 16, generation of an MFAT with a TOTP secret key is now described. Identity provider key bootstrapping and MFA flow initiation are performed as discussed further above. Alternatively, if a TOTP secret key per user does not exist, the TOTP secret key is generated by the CLIS 265. In an optional operation, the WA implicit (public IP) or explicit (GPS) location of the WA instance 208 may be communicated to a network location service 361, which returns zone information from which the appropriate gateway PoP public keys are selected. IP/IDP 265 encrypts the symmetric key with the gateway PoP public key(s), and generates the MFAT including the encrypted TOTP secret key and also provides an encrypted version of the symmetric key. The MFAT is user-device bound and signed by the IP public 265 public key, and the MFAT is then sent to and stored by the WA instance 208.

Figure 17:
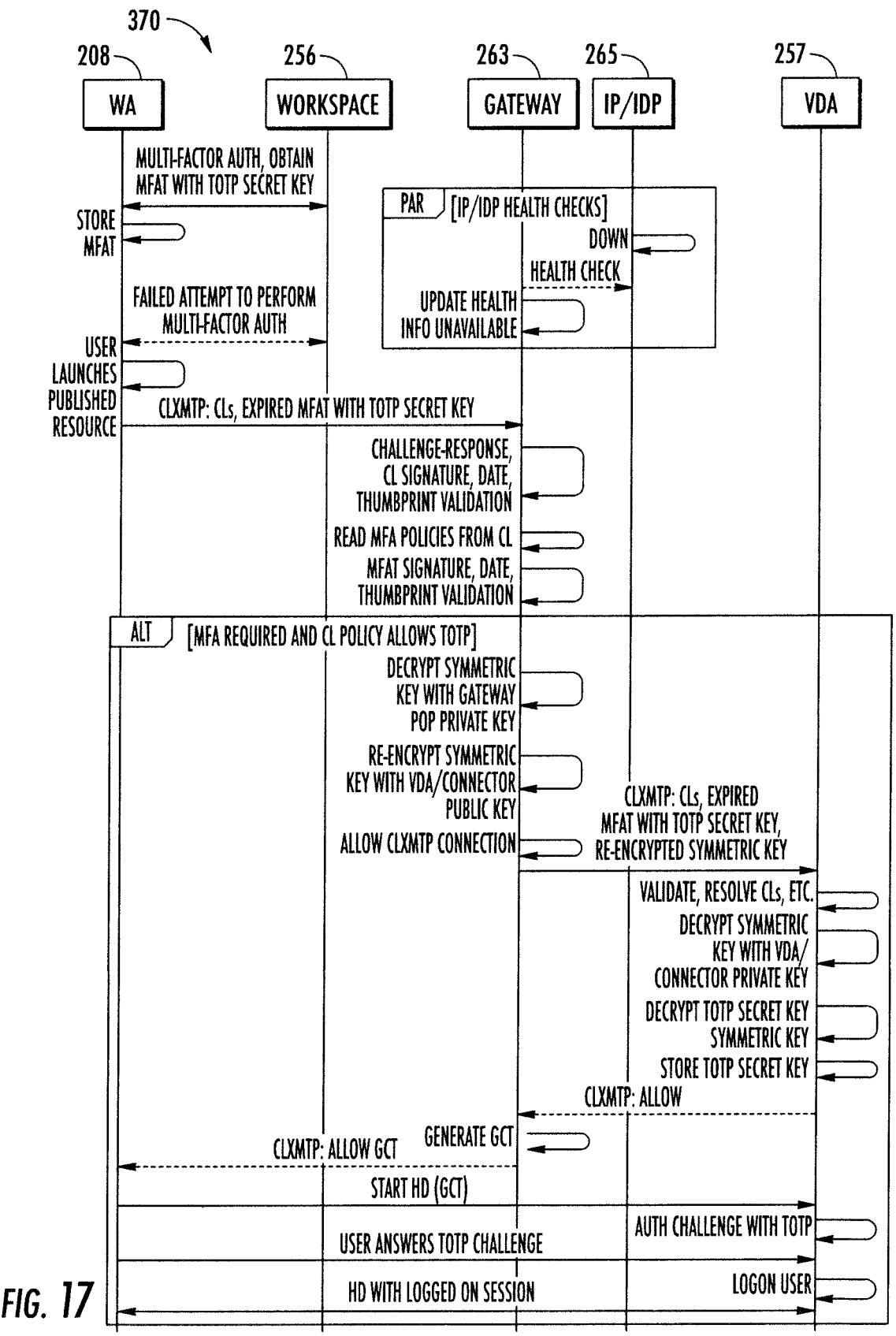
FIG. 17 is a sequence flow diagram illustrating a launch with connection leases and expired MFA token with a TOTP secret key during offline conditions which may be performed by the system of FIG. 8 in an example embodiment.

A launch with CLs and expired MFA token with a TOTP secret key when IP/IDP 265 is down is now described with reference to the sequence flow diagram of FIG. 17. The MFAT generation and IP/IDP 265 health checks are performed as described further above. Notwithstanding a subsequent failed attempt to perform MFA a user launches a published resource, which initiates a CLXMTP connection based upon the appropriate CL(s), expired MFAT and TOTP secret key. The gateway performs a challenge-response, reads the MFA policies from the CL, and validates the MFAT signature, date, and thumbprint as discussed above. When the MFAT is expired and the CL policy allows TOTP, the gateway 263 then decrypts the symmetric key with the gateway PoP private key, and re-encrypts the symmetric key with the VDA 257 and/or gateway 263 public keys, and allows the CLXMTP connection. The gateway 263 initiates a CLXMTP connection with the VDA 257, which in turn validates and resolves the CLs, decrypts the symmetric key with the VDA 257/gateway 263 private key, and stores the TOTP secret key. The gateway 263 then generates the Gateway Connection Ticket (CGT), with which the WA instance 208 may initiate the HD connection with the VDA 257 to access a computing session.

Figure 18:
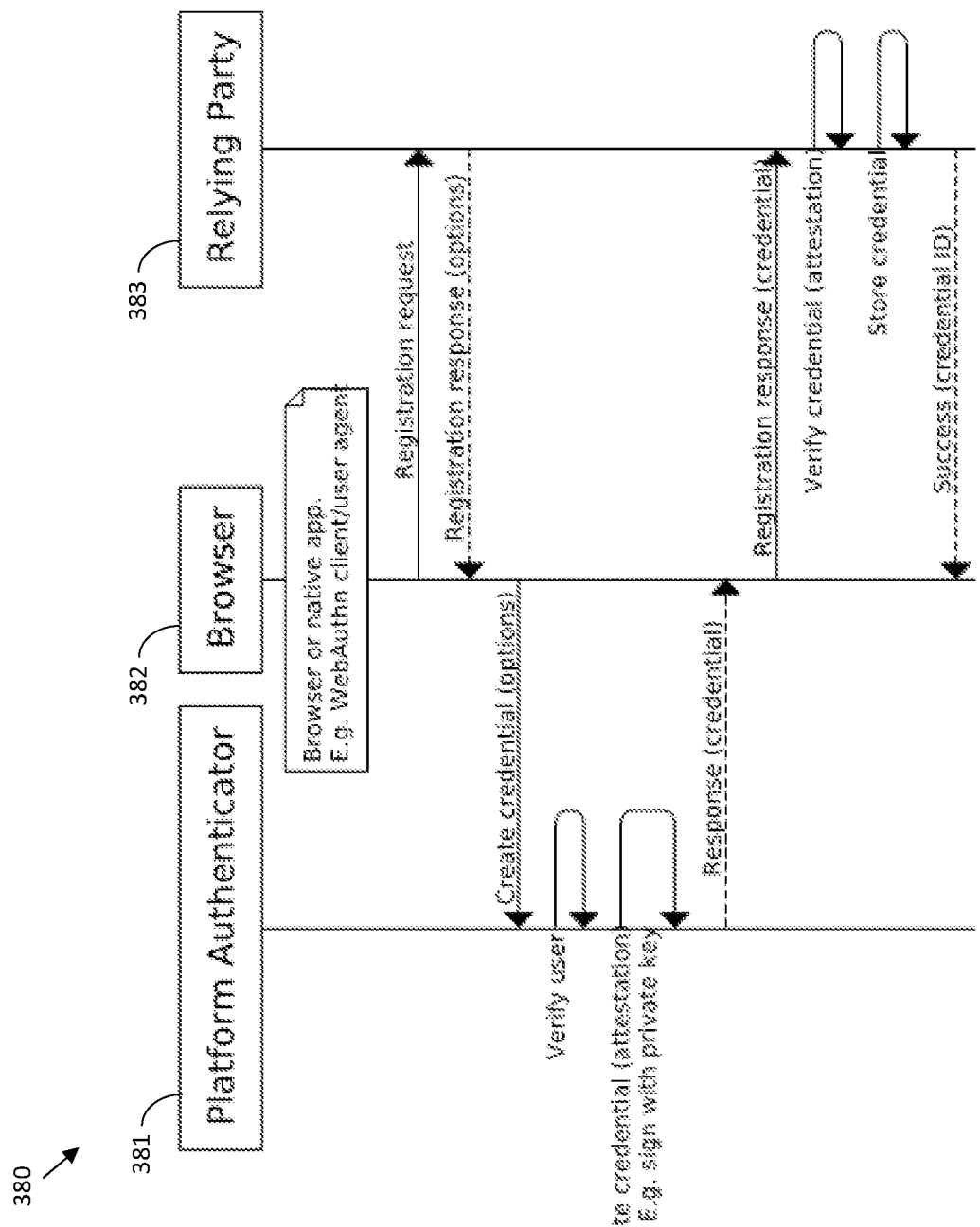
FIG. 18 is a sequence flow diagram illustrating a new user registration sequence which may be performed by the system of FIG. 8 in an example embodiment.

A new user registration to make a credential is now described with reference to the flow diagram 380 of FIG. 18. From a browser (or native app) 382 such as a WebAuthn client/user agent, a registration request is sent to a relying party 383, to which a registration response is returned. The browser requests credential creation from a platform authenticator 381, which verifies the user and creates the credential (e.g., by signing with a private key). Upon receiving a response, the browser 382 provides the registration response (credential) with the relying party 383, which verifies the credential (attestation), stores it, and indicates successful completion to the browser.

Figure 19:
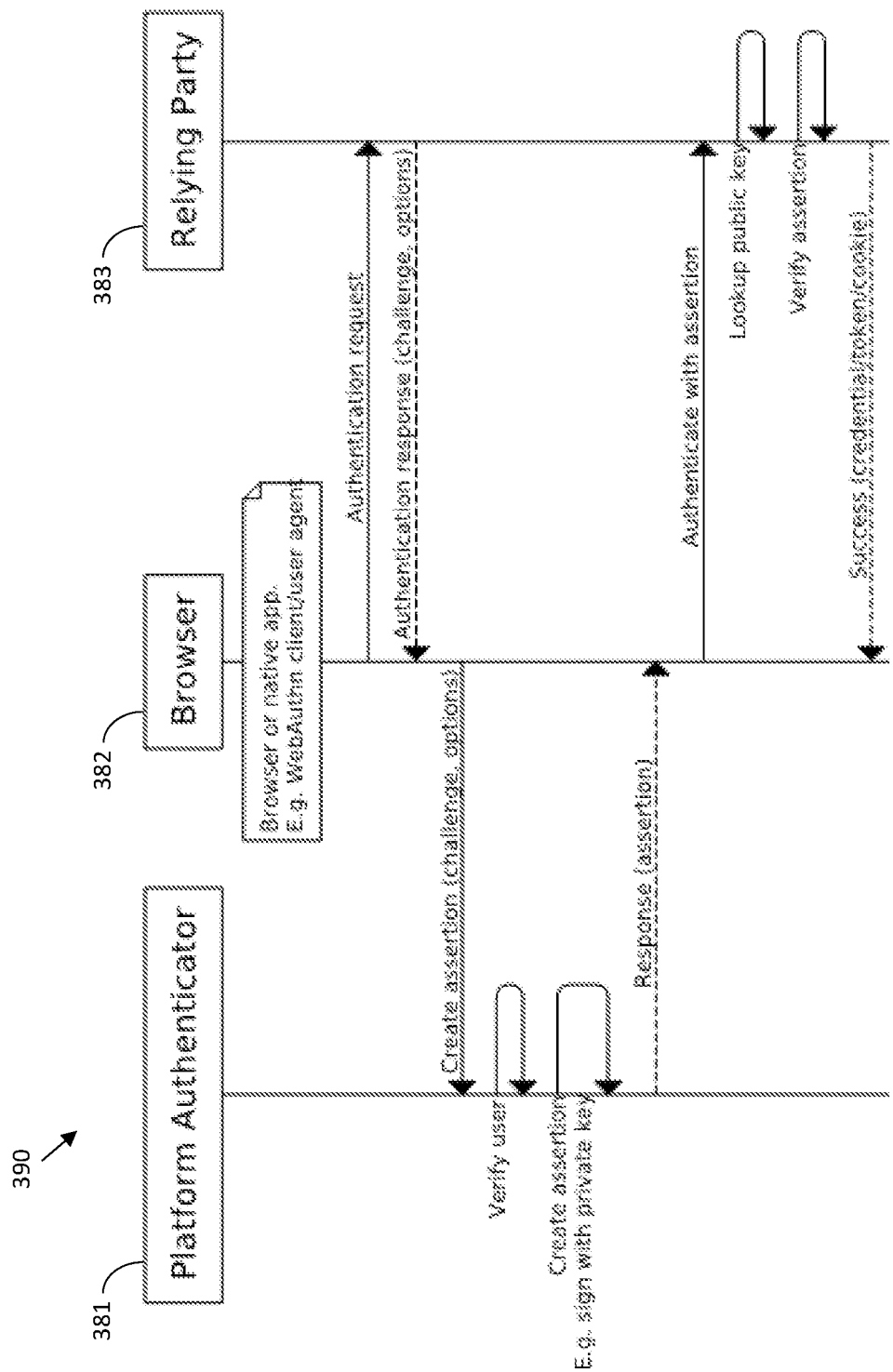
FIG. 19 is a sequence flow diagram illustrating a get and verify association user authentication sequence which may be performed by the system of FIG. 8 in an example embodiment.

An approach to authenticate a user by verifying an assertion using FIDO2 is now described with reference to the sequence flow diagram 390 of FIG. 19. The browser 382 sends an authentication request to the relying party 383, to which an authentication response (with challenge options) is returned. The browser 382 requests an assertion be created by the platform authenticator 381, which verifies the user and creates the assertion (e.g., by signing with a private key), and responds with the assertion to the browser. The browser 382 authenticates with the relying party 383 with the assertion, and the relying party looks up the public key, verifies the assertion, and informs the browser of the successful completion.

It should be noted that the above-described concepts can be applied to different CL use cases, e.g., for Web/SaaS apps, cloud storage apps, CEM native apps, etc. The various approaches discussed above are also useful for online conditions as well as existing traditional ICA file-based launches. For example, when the VDA 253 is being prepared for a user session (Launch and PrepareForSession call from WA→Workspace→Broker→VDA), the VDA could be informed about the security context of the user and all of the MFA policy requirements can be enforced on the VDA.

Figure 20:
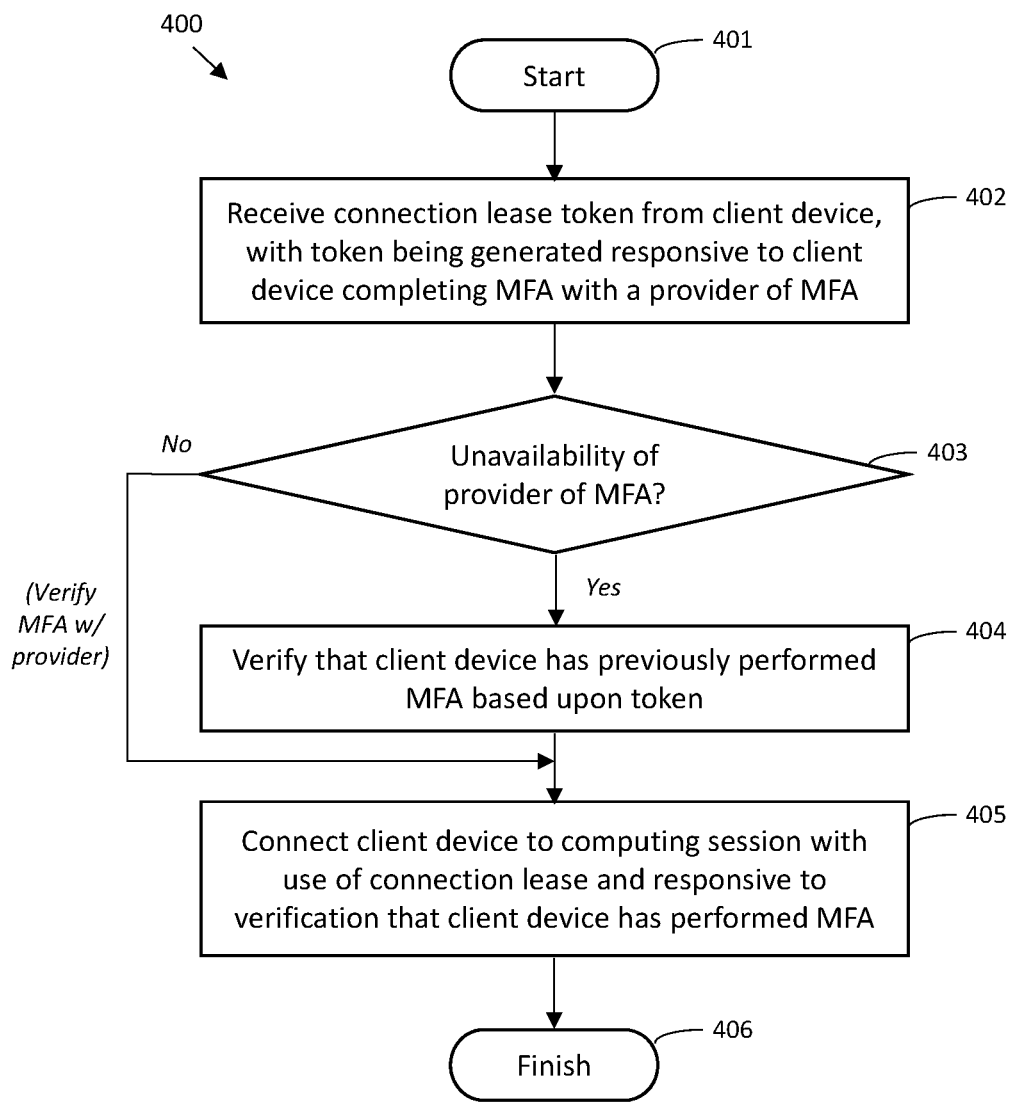
FIG. 20 is a flow diagram illustrating method aspects which may be performed by the system of FIG. 6 in an example implementation.

Turning to the flow diagram 400 of FIG. 20, a related method is now described. Beginning at Block 401, the method illustratively includes, at a computing device 201, receiving a connection lease and a token from a client device 204, with the token being generated responsive to the client device completing MFA with a provider of MFA, at Block 402, as discussed further above. The method further illustratively includes verifying, responsive to unavailability of the provider of MFA 205 (Block 403), that the client device 204 has previously performed MFA based upon the token, at Block 404, and connecting the client device to a computing session 206 with use of the connection lease and responsive to the verification that the client device has performed MFA (Block 405), as also discussed further above. The method of FIG. 20 illustratively concludes at Block 406.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a memory and a processor configured to cooperate with the memory to:
receive a connection lease and a token from a client device, the token being generated responsive to the client device completing Multi-Factor Authentication (MFA) with a provider of MFA in compliance with an MFA policy;
verify, responsive to unavailability of the provider of MFA, that the client device has previously performed MFA based upon the token and a secondary information, wherein the secondary information is selected from an IP address for a prior successful MFA, a latency associated with communications with the client device, or a combination thereof;
change a level of access associated with a computing session responsive to an identity provider being offline; and
connect the client device to the computing session with use of the connection lease and responsive to the verification that the client device has performed MFA, wherein the connecting comprises selecting an appropriate policy tier from a plurality of tiers of the MFA policy based on a user context.

2. The computing device of claim 1 wherein the connection lease includes data about the MFA; and wherein the processor is further configured to verify that the token is valid based upon the data, and connect the client device to the computing session also responsive to verification of the token being valid.

3. The computing device of claim 1 wherein the processor verifies that the client device has performed MFA for external connections outside of a network.

4. The computing device of claim 1 wherein the token has an expiration, and wherein the processor requests MFA authentication from the MFA provider prior to the expiration of the token.

5. The computing device of claim 4 wherein the processor is further configured to delay the MFA authentication request responsive to an identity provider being offline and extend the connection to the computing session during the delay.

6. The computing device of claim 1 wherein the MFA comprises generating a Time-based One-time Password (TOTP) based upon a key, and wherein the processor is further configured to receive the key and verify that the client device has performed MFA based upon the key.

7. A method comprising:
at a computing device,
receiving a connection lease and a token from a client device, the token being generated responsive to the client device completing Multi-Factor Authentication (MFA) with a provider of MFA in compliance with an MFA policy;
verifying, responsive to unavailability of the provider of MFA, that the client device has previously performed MFA based upon the token and a secondary information, wherein the secondary information is selected from an IP address for a prior successful MFA, a latency associated with communications with the client device, or a combination thereof;
changing a level of access associated with a computing session responsive to an identity provider being offline; and
connecting the client device to the computing session with use of the connection lease and responsive to the verification that the client device has performed MFA, wherein the connecting comprises selecting an appropriate policy tier from a plurality of tiers of the MFA policy based on a user context.

8. The method of claim 7 wherein the connection lease includes data about the MFA; wherein verifying further comprises verifying that the token is valid based upon the data; and wherein connecting further comprises connecting the client device to the computing session also responsive to verification of the token being valid.

9. The method of claim 7 wherein verifying comprises verifying that the client device has performed MFA for external connections outside of a network.

10. The method of claim 7 wherein the token has an expiration, and further comprising, at the computing device, requesting MFA authentication from the MFA provider prior to the expiration of the token.

11. The method of claim 7 wherein the MFA comprises generating a Time-based One-time Password (TOTP) based upon a key, and further comprising, at the computing device, receiving the key and verifying that the client device has performed MFA based upon the key.

12. A non-transitory computer-readable medium having computer-executable instructions for causing a computing device to perform steps comprising:
receiving a connection lease and a token from a client device, the token being generated responsive to the client device completing Multi-Factor Authentication (MFA) with a provider of MFA in compliance with an MFA policy;
verifying, responsive to unavailability of the provider of MFA, that the client device has previously performed MFA based upon the token and a secondary information, wherein the secondary information is selected from an IP address for a prior successful MFA, a latency associated with communications with the client device, or a combination thereof;
changing a level of access associated with a computing session responsive to an identity provider being offline; and
connecting the client device to the computing session with use of the connection lease and responsive to the verification that the client device has performed MFA, wherein the connecting comprises selecting an appropriate policy tier from a plurality of tiers of the MFA policy based on a user context.

13. The non-transitory computer-readable medium of claim 12 wherein the connection lease includes data about the MFA; wherein verifying further comprises verifying that the token is valid based upon the data; and wherein connecting further comprises connecting the client device to the computing session also responsive to verification of the token being valid.

14. The non-transitory computer-readable medium of claim 12 wherein verifying comprises verifying that the client device has performed MFA for external connections outside of a network.

15. The non-transitory computer-readable medium of claim 12 wherein the token has an expiration, and further having computer-executable instructions for causing the computing device to request MFA authentication from the MFA provider prior to the expiration of the token.

16. The non-transitory computer-readable medium of claim 12 wherein the MFA comprises generating a Time-based One-time Password (TOTP) based upon a key, and further having computer-executable instructions for causing the computing device to receive the key and verify that the client device has performed MFA based upon the key.

* * * * *